US008751023B2

(12) United States Patent
Lu et al.

(10) Patent No.: US 8,751,023 B2
(45) Date of Patent: Jun. 10, 2014

(54) AUDIO PLAYBACK POSITIONING METHOD AND ELECTRONIC DEVICE SYSTEM UTILIZING THE SAME

(75) Inventors: Chi-Chang Lu, New Taipei (TW); Jin-Hau Kuo, New Taipei (TW); Chi-Hao Wu, New Taipei (TW); Chia-Hao Chang, New Taipei (TW); Hsiao-Wei Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1322 days.

(21) Appl. No.: 12/543,588

(22) Filed: Aug. 19, 2009

(65) Prior Publication Data

US 2010/0305726 A1 Dec. 2, 2010

(30) Foreign Application Priority Data

May 27, 2009 (CN) .......................... 2009 1 0302684

(51) Int. Cl.
*G06F 17/00* (2006.01)
*G06F 3/00* (2006.01)
*G06F 3/14* (2006.01)
*H04N 5/783* (2006.01)

(52) U.S. Cl.
USPC .............. 700/94; 715/716; 715/864; 386/343

(58) Field of Classification Search
USPC ............ 700/94; 715/786, 716, 720, 853, 854, 715/864; 386/239, 241, 248, 343
See application file for complete search history.

(56) References Cited

U.S. PATENT DOCUMENTS

| | | | | |
|---|---|---|---|---|
| 6,070,228 A * | 5/2000 | Belknap et al. | ................ | 711/118 |
| 6,172,948 B1 * | 1/2001 | Keller et al. | .................... | 369/83 |
| 6,950,994 B2 * | 9/2005 | Dharap | ........................ | 715/864 |
| 8,306,404 B2 * | 11/2012 | Lee | ................................ | 386/343 |
| 2002/0063737 A1* | 5/2002 | Feig et al. | ..................... | 345/786 |
| 2002/0186262 A1* | 12/2002 | Itavaara et al. | ................ | 345/864 |
| 2005/0086703 A1* | 4/2005 | Gupta et al. | ................... | 725/135 |
| 2007/0191978 A1 | 8/2007 | Chung | | |
| 2008/0088706 A1 | 4/2008 | Girgensohn et al. | | |
| 2008/0235583 A1* | 9/2008 | Ostergaard et al. | ........... | 715/716 |

* cited by examiner

*Primary Examiner* — Davetta W Goins
*Assistant Examiner* — Daniel Sellers
(74) *Attorney, Agent, or Firm* — Novak Druce Connolly Bove + Quigg LLP

(57) ABSTRACT

An audio playback positioning method. A processor retrieves audio data from a memory, divides a progress bar showing playback time of the audio data into segments, utilizes a length of a progress bar segment as a unit to perform playback skipping on the audio data, and retrieves an audio data segment through the skipping. The processor further divides a progress bar segment corresponding to the retrieved audio data segment into sub-segments in response to input operations, and utilizes the length of a sub-segment as a unit to perform playback skipping on the retrieved audio data segment to retrieve and perform playback operation on a target position thereon.

15 Claims, 24 Drawing Sheets

AUDIO PLAYBACK POSITIONING METHOD AND ELECTRONIC DEVICE SYSTEM UTILIZING THE SAME

BACKGROUND

1. Technical Field

The disclosure relates to computer techniques, and more particularly to methods for positioning audio playback and electronic device systems utilizing the same.

2. Description of Related Art

A progress bar is widely used in various music players to show music playback progress and assist music playing. A sliding cursor is typically shown in a progress bar for navigating throughout a playback title, such as a song. Since there is no scale provided along the progress bar, precisely accessing a point in the title is very difficult. Window size adjustment to a music player program also affects precision of the bar. Additionally, the cursor must be controlled by a pointing device, such as a mouse or a touch pad, which is not always provided in all music players.

Fast-forward and rewind functions on portable music players are time consuming when utilized for searching for a position in a long title, and are unfriendly when a "tricky play" is desired. Some popular players allow stepping through a song during playback but the method is not sophisticated enough.

DETAILED DESCRIPTION

Description of exemplary embodiments of the audio playback positioning method and electronic systems utilizing the same are given in the following paragraphs which are organized as follows:
1. System Overview
2. Exemplary Embodiments of the Positioning Method
   2.1 First Exemplary Embodiment of the Positioning Method
   2.2 Second Exemplary Embodiment of the Positioning Method
   2.3 Third Exemplary Embodiment of the Positioning Method
   2.4 Fourth Exemplary Embodiment of the Positioning Method
3. Variation of Embodiments
   3.1 Alternative Embodiments of the Positioning Method
   3.2 Alternative Embodiments of the Electronic Device
4. Conclusion

1. SYSTEM OVERVIEW

The audio playback positioning method can be implemented in various electronic devices, such as cell phones, personal digital assistants (PDAs), set-top boxes (STBs), televisions, game consoles or media players. An example of an electronic device implementing the positioning method is given in the following.

Figure 1:
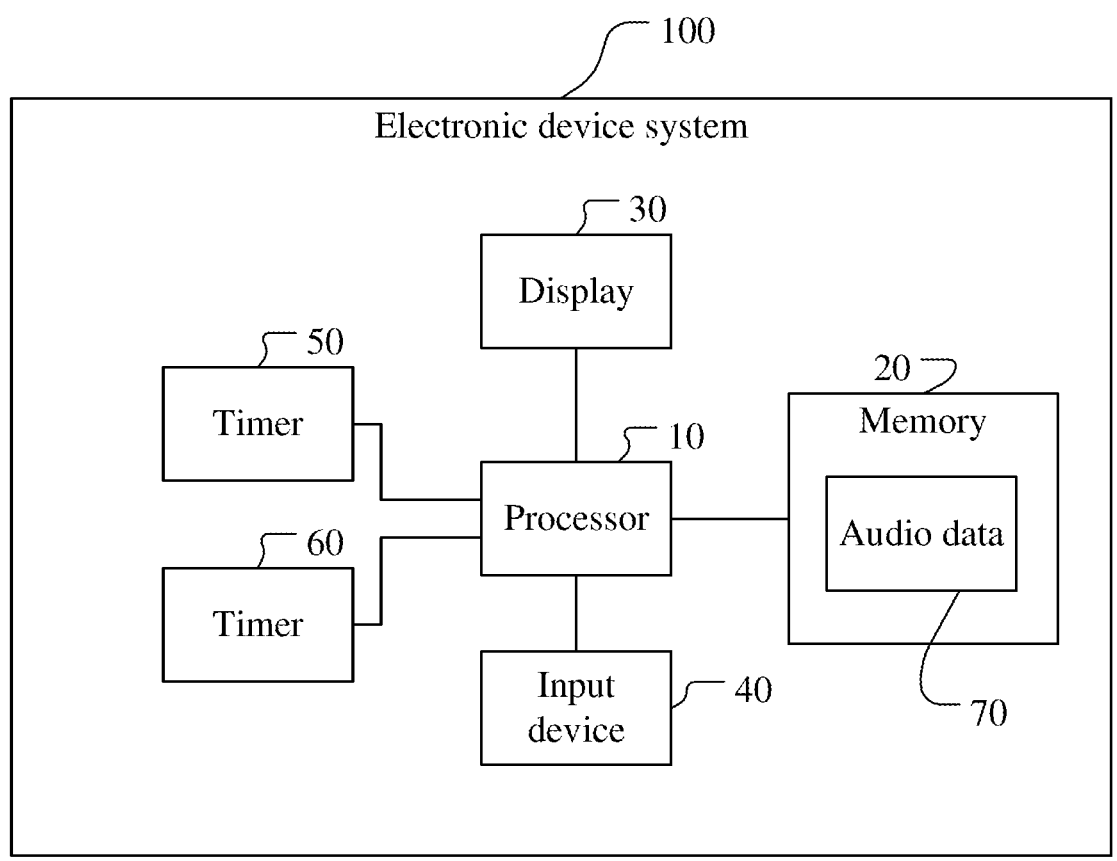
FIG. 1 is a block diagram of an embodiment of an electronic device system of the disclosure.

With reference to FIG. 1, an electronic device 100 comprises a processor 10, a memory 20, a display 30, an input unit 40, and timers 50 and 60. The processor 10 may comprise various integrated circuits (ICs) for processing data and machine-readable instructions. The processor 10 may be packaged as a chip or comprise a plurality of interconnected chips. For example, the processor 10 may only comprise a central processing unit (CPU) or a combination of a CPU, a digital signal processor (DSP), and a chip of a communication controller, such as a controller of a cellular communication, infrared, Bluetooth™, or wireless local area network (LAN) communication devices. The communication controller coordinates communication among components of the electronic device 100 or communication between the electronic device 100 and external devices. The memory 20 stores audio data 70 and may comprise a random access memory (RAM), a nonvolatile memory, a mass storage device (such as a hard disk drive), or a combination thereof. The nonvolatile memory, for example, may comprise electrically erasable programmable read-only memory (EEPROM) and/or flash memory. The memory 20 and the processor 10 may be packaged as one chip or packaged separately and interconnected through buses.

The display 30 is operable to display text and images, and may comprise e-paper, a display made up of organic light emitting diode (OLED), a field emission display (FED), or a liquid crystal display (LCD). The display 30 may display various graphical user interfaces (GUIs) including windows, scroll bars, audio playback progress bar, and text area. The display 30 may comprise a single display or a plurality of displays in different sizes. The processor 10 may present various GUIs on the display 30 as detailed in the following paragraphs.

The input unit 40 may comprise various input devices to input data or signals of digits, characters and symbols to the electronic device 100, such as any one or more of a touch panel, a touch screen, a keyboard, and a microphone. The input unit 40 may also comprise controller chips of such input devices. The timers 50 and 60 keep track of predetermined time intervals and may comprise circuits, machine-readable programs, or a combination thereof. Each of the timers 50 and 60 generates signals to notify expiration of the predetermined time intervals. Components of the electronic device system 100 can be connected through wired or wireless communication channels.

Figure 2A:
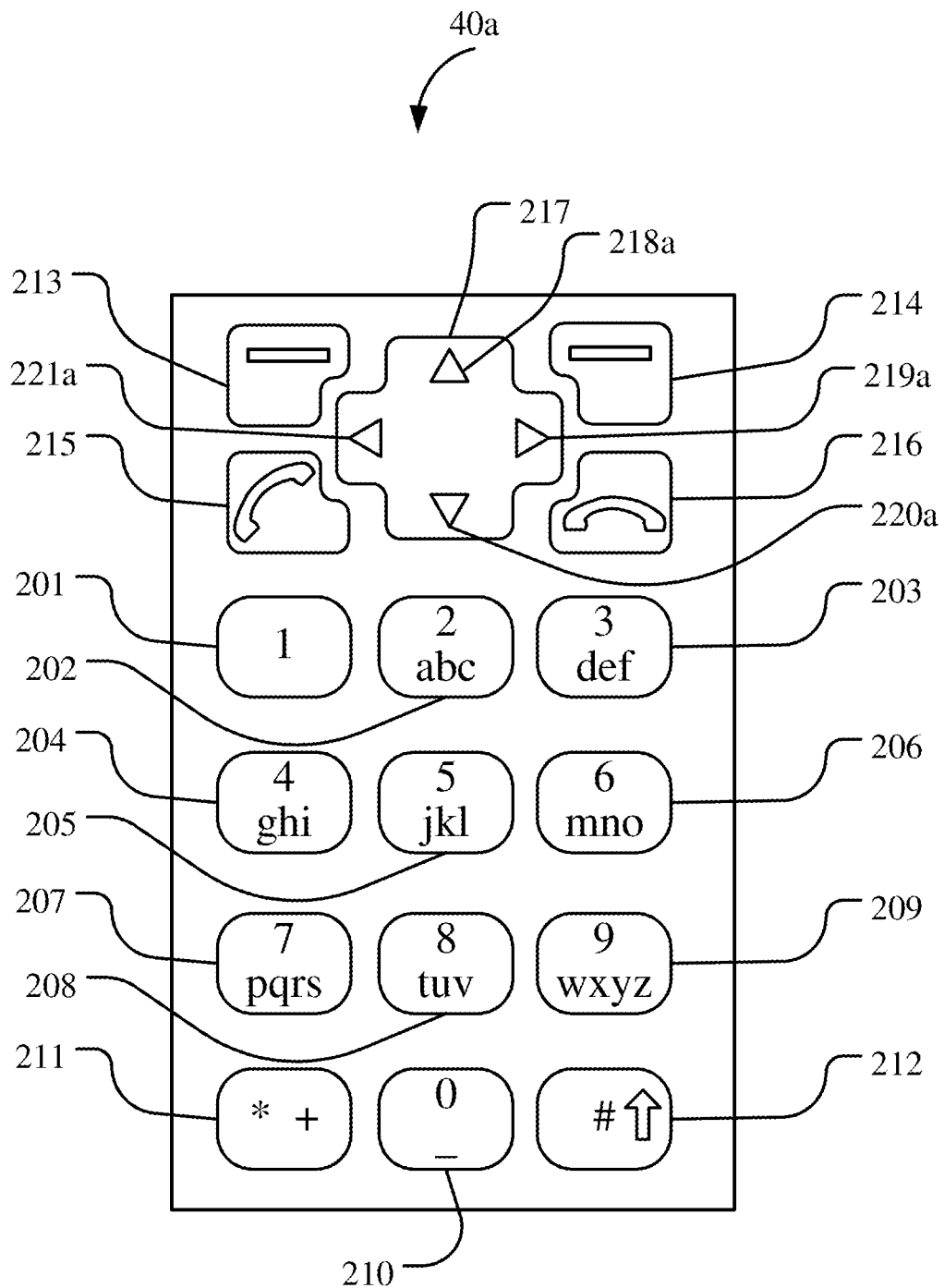
FIGS. 2A and 2B are block diagrams of embodiments of input devices of the electronic device system of the disclosure.

A keyboard 40a in FIG. 2A is an exemplary embodiment of the input unit 40. The keyboard 40a may be made of mechanical structures or comprise a virtual keyboard shown on the display 30. The keyboard comprises keys 201-217. Keys 213 and 214 are function keys for triggering functions based on software programs executed by the electronic device 100. The key 216 is an on-hook key operable to trigger a telephone call. The key 215 is an off-hook key operable to terminate telephone calls. The key 217 is operable to direct direction and movement of a cursor on the display 30. Activation of points 218*a*, 219*a*, 220*a*, and 221*a* respectively trigger movement of a cursor or an icon up, right, down, and left. Digits, letters, and/or symbols corresponding to the keys 201-212 are shown on respective keys in FIG. 2, but are not intended to be limited thereto.

The electronic device 100 may be installed with various media player programs that are user-selectable. An object to which the positioning method is applied is referred to as a target object. The length of a target object is assumed as a constant D in the following description. When the processor 10 applies the positioning method to the audio data 70, the total length thereof may be represented by file size or total playback time of the audio data 70 measured in time units, such as minutes or seconds. The total playback time is a period counted from the beginning to the end of playing the audio data 70. The audio data 70 may comprise one or more titles of audio data. A title may comprise an audio file. For example, the audio data 70 may comprise a plurality of titles in a playlist filtered and arranged based on title attribute.

2. EXEMPLARY EMBODIMENTS OF THE POSITIONING METHOD

The input device 40 may input digits to the electronic device system 100 for various functions. For example, the input device 40 may input digits to the electronic device system 100 as a phone number for calling or message transmission, or a number for tuning a tuner to a channel to receive broadcast signals. In the following description, digits received by the electronic device system 100 are utilized as indices to locate positions in a target object, such as audio data. The electronic device system 100 determines a corresponding function for the digits received from numeric keys or other input devices. The method for positioning playback of audio data may be implemented by computer programs executed in the electronic device system 100.

2.1 First Exemplary Embodiment of the Positioning Method

Figure 3A:
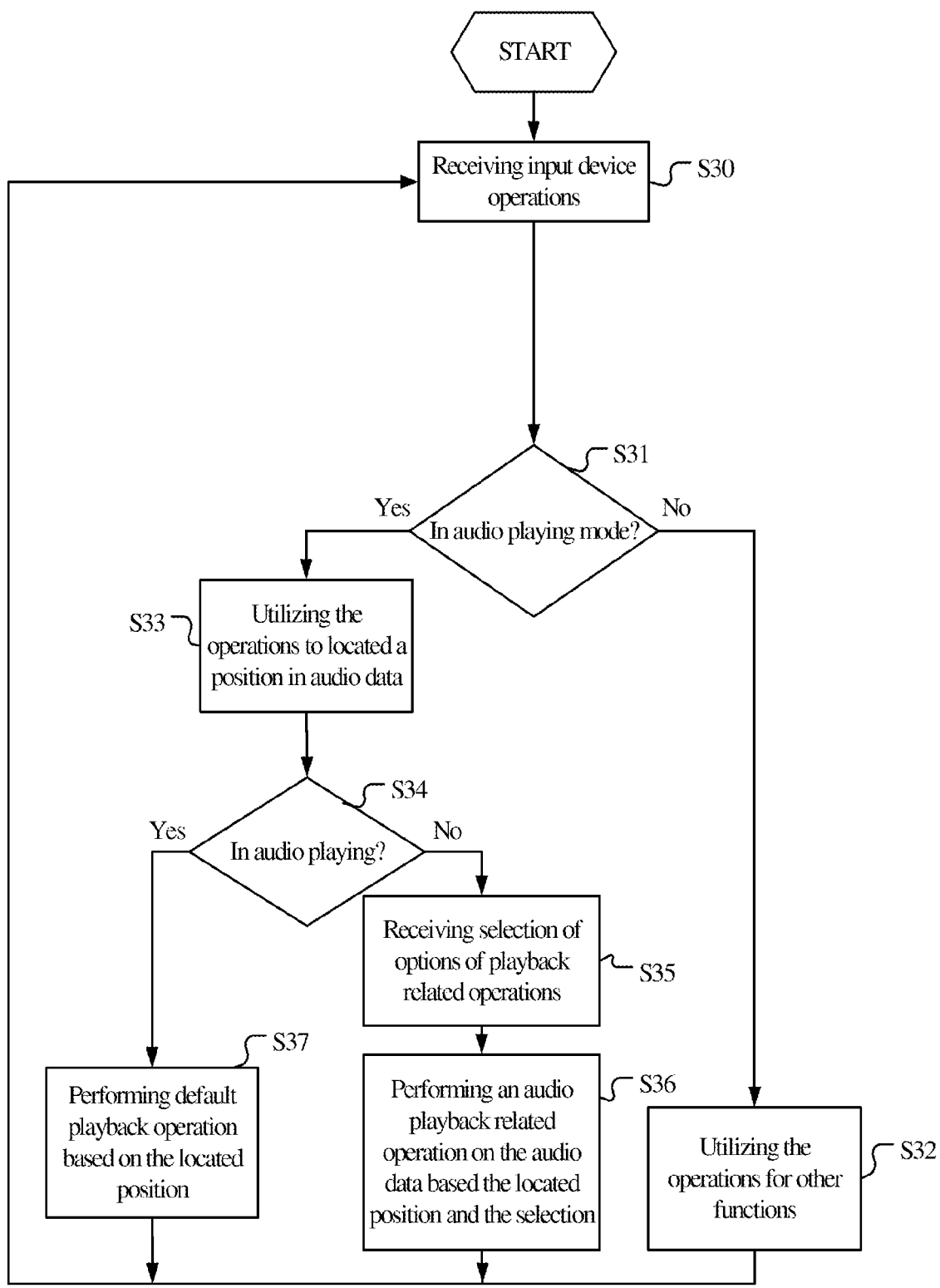
FIGS. 3A-3E are flowcharts showing embodiments of the audio playback positioning method of the disclosure.

With reference to FIG. 3A, when receiving digits from the input device 40 (step S30), the processor 10 determines if the electronic device system 100 is in an audio playing mode (step S31). If the electronic device system 100 is not in the audio playing mode, the processor 10 utilizes the received digits for functions irrelevant to audio playback, such as converting the received digits into phone numbers or channel numbers (step S32). If the electronic device system 100 is in the audio playing mode, the processor 10 utilizes the received digits for audio data positioning (step S33). The electronic device system 100 in the audio playing mode may, for example, show audio playback related GUIs on the display 30. After locating a position or a segment in the audio data 70 in the step S33, the processor 10 determines if the electronic device system 100 is playing the audio data 70 (step S34). If the electronic device system 100 is playing the audio data 70, the processor 10 directly applies a default operation on the audio data 70 based on the located position or audio segment, such as switching audio playback to the located position or audio segment (step S37). If the electronic device system 100 is not playing the audio data 70, the processor 10 receives a selection of playback operation options (step S35) and applies a selected operation on the audio data 70 based on the located position or audio segment (step S36). For example, the operations in steps S35-S37 may comprise audio playback, fast forwarding or rewinding operations, bookmark setting, or playback repeating. The optional operations may be triggered by a selection of options displayed on the display 30 or by operation of corresponding keys of the input device 40.

Embodiments of audio playback positioning in the step S33 is detailed in the following paragraphs. The electronic device system 100 utilizes a timer to keep an extensible period of time, during which the processor 10 may receive more digits to more precisely locate a position or a segment in the audio data. When the processor 10 is playing the audio data 70 at a current position thereof, a forward skipping operation triggers the playing of the audio data 70 to be switched to a first target position posterior to the current position in the audio data 70 with respect to playback time, and a backward skipping operation triggers the playing of the audio data 70 to be switched to a second target position prior to the current position in the audio data 70 with respect to playback time. Note that a segment of a target object may represent a constituent portion of the target object or a sub-segment of such constituent portion. A sub-segment of a segment is a constituent segment thereof of relatively smaller size.

The processor 10 may apply the positioning method to the audio data 70, a progress bar thereof, video data, a volume control bar and a playback speed control GUI of a player program, and a scroll bar of a playlist. A cursor in a volume control bar specifies the volume at which the audio data 70 is played. A playback speed control GUI specifies the playback speed at which the audio data 70 is played. When executing the positioning method, the processor 10 calculates a length D of the entire target object, and converts received digits into a position or a segment in the target object relative to the length D thereof. For example, when the audio data 70 is stored as a file in the non-volatile memory using specific encoding and compression formats, the processor 10 may obtain the length D of the audio data 70 from a difference between an address corresponding to the end of the file memory and an address corresponding to the beginning of the file in the non-volatile memory. Alternatively, the processor 10 may decompress and decode the encoded and compressed audio data 70 to retrieve sampled waveform data represented by the audio data 70. The processor 10 may obtain the total playback time of the audio data 70 as the length D thereof from the waveform data and a sampling rate thereof. The processor 10 may apply the positioning method to the decompressed and decoded waveform data. When applying the positioning method to a volume control bar as the target object, the processor 10 may obtain the length of the volume control bar from a difference between the maximum and the minimum volume values of the electronic device system 100. When applying the positioning method to a playback speed control GUI as the target object, the processor 10 may obtain the length of the playback speed control GUI from a difference between the maximum and the minimum playback speed values of the electronic device system 100. When applying the positioning method to a playlist as the target object, the processor 10 may calculate the total number of titles in the playlist as the length of the playlist. Execution of embodiments of the positioning method is described with reference to arrows and blocks in the presented flowcharts.

Figure 3B:
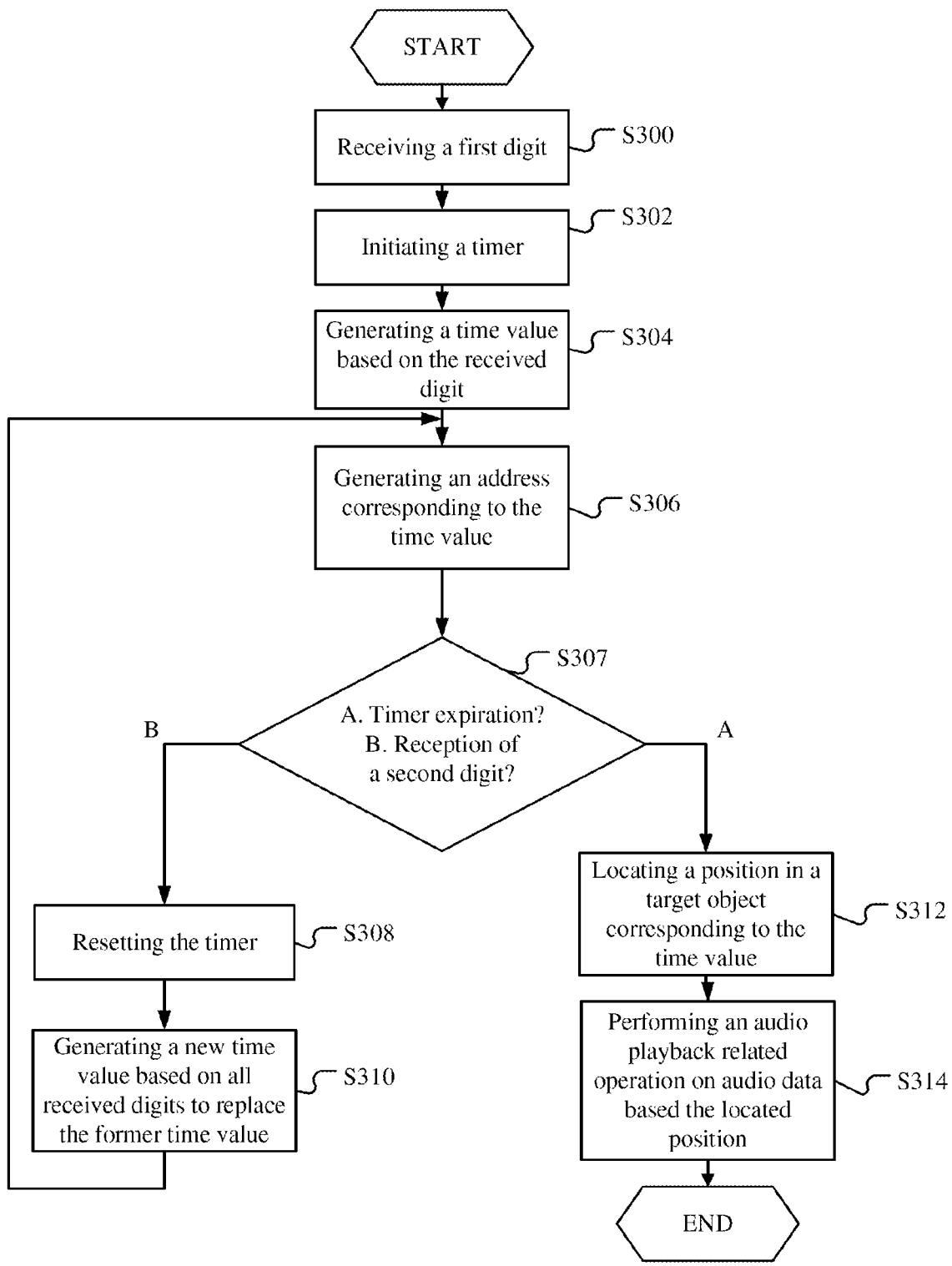

FIG. 3B shows an embodiment of the method for positioning playback of audio data executed by the electronic device system 100. A progress bar of the audio data 70 is the active GUI element in the audio playing mode of the electronic device system 100, and the processor 10 accordingly applies the positioning method to the audio data 70 represented by the progress bar based on received digits.

The processor 10 receives a first digit, such as 0, 1, 2, 3, . . . or 9, from a numeric key (step S300) and initiates the timer 50 to keep a predetermined period of time (step S302). The processor 10 generates a time value corresponding to a position in the audio data 70 and a position on the progress bar based on the received first digit (step S304) and generates an address of the position in the audio data 70 corresponding to the time value (step S306). For example, the processor 10 when receiving the digit "3" in step S300 may generate time value "00:00:03", that is 0 hours, 0 minutes and 3 seconds, and generate an address of a position in the audio data 70 corresponding to playback time "00:00:03". The playback time of a position is a duration of play counted from the beginning of the audio data 70 to the requested position of the audio data 70.

The processor 10 determines if the timer 50 expires (event A), or if a second digit is received from the input device 40 before the timer 50 expires (event B) (step S307).

In the step S307, if a second digit is received from the input device 40 before the timer 50 expires (event B), the processor 10 resets the timer 50 (step S308) and generates an updated time value from all received digits (including the first and second digits) to correspond to a new position in the audio data 70 in substitution for the previously-generated time value (step S310). The step S306 is repeated to generate an address of the new position. For example, when receiving a digit "5" in the step S307, the processor 10 may convert the digits "3" and "5" to a time value "00:00:35", that is 0 hours, 0 minutes and 35 seconds. Similarly, when further receiving a digit "2" in repeating the step S307, the processor 10 may convert the digits "3", "5", and "2" to a time value of "00:03:52", that is 0 hours, 3 minutes and 52 seconds. When receiving digits "3", "5", "2", "1", and "0", the processor 10 may convert the concatenation of digits "35210" to a time value "03:52:10", that is 3 hours, 52 minutes and 10 seconds. Although the time format using two colons to delimit hour, minute, and second is illustrated in the description, time may be represented in various formats in which some may omit hours, and some may omit the colon ":" between minutes and seconds or replace the colon ":" with other symbols.

Figure 4:
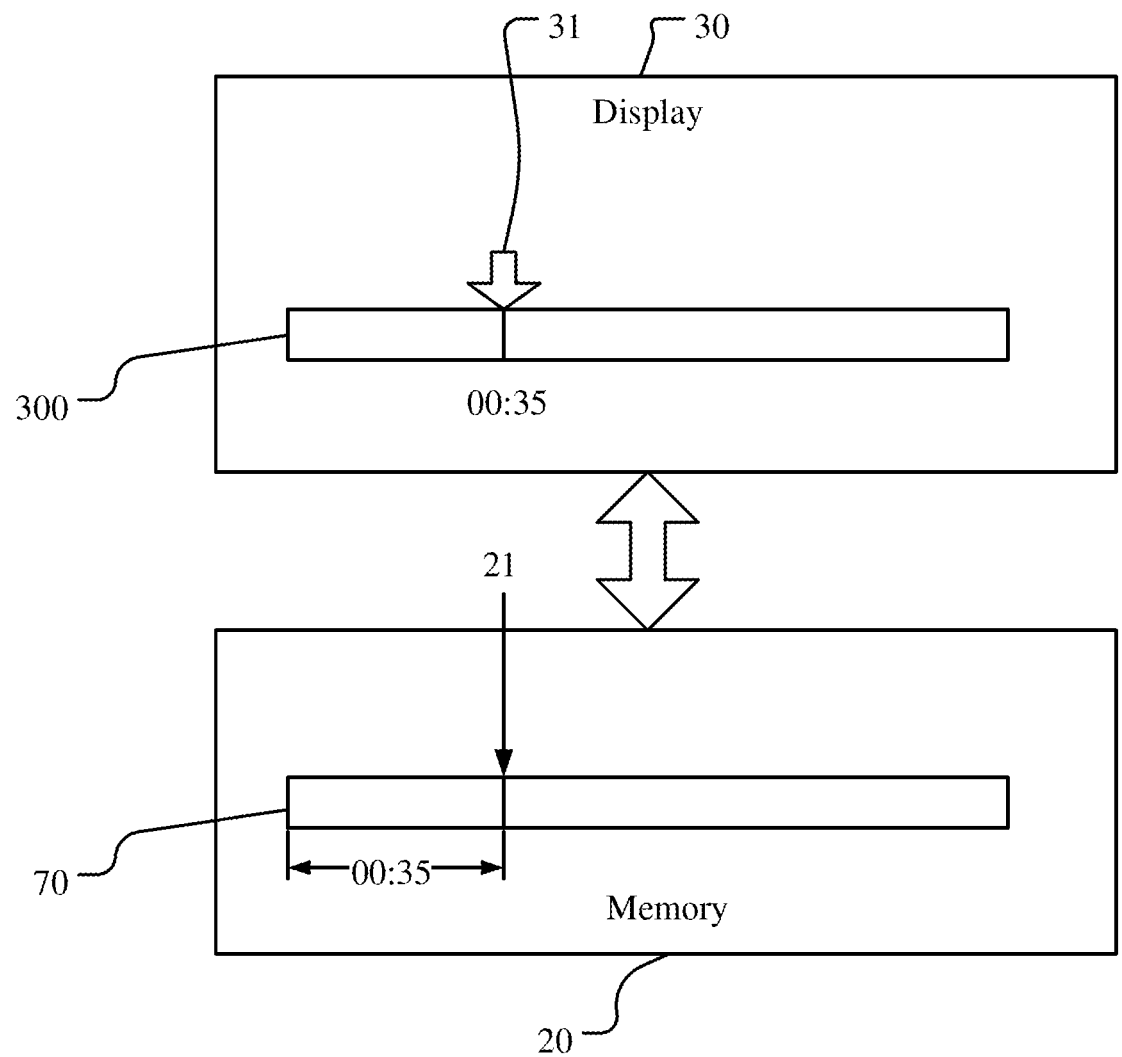
FIG. 4 is a schematic diagram showing exemplary operations of a first embodiment of the disclosed method.

When the timer 50 expires (event A), the processor 10 locates a position in the audio data 70 corresponding to the last generated time value in response to the expiration of the timer 50 (step S312) and performs a playback operation based on the located position (step S314). With reference to FIG. 4, if the last generated time value is "00:35", the processor 10 locates a position 21 in the audio data 70 corresponding to playback time "00:35" in the step S306, displays an icon 31 indicating a position on a progress bar 300 corresponding to the playback time "00:35" on the display 30.

In the step S314, for example, the processor 10 may begin playing the audio data 70 from the located position (e.g., the position 21), or set a bookmark at the located position. The processor 10 may perform the step S314 in response to expiration of the timer 50 or an operation of the input device 40 that triggers the playback operation in the step S314.

The processor 10 may show an alert message if the generated time value is greater than the total playback time of the audio data 70. The electronic device system 100 may provide measures to prevent mistaken time values being entered. For example, assuming that the total playback time of the audio data 70 is "3:45", and each of the variables $a_1$, $a_2$, $a_3$, and $a_4$ comprised in the electronic device system 100 has value "0". The processor 10 orderly stores each received digit from the input device 40 into one of the variables $a_1$, $a_2$, $a_3$, and $a_4$. In steps S304 and S310, the processor 10 obtains the result of $(10 \times a_1 + a_2)$ as a count of minutes in the generated time value, and the result of $(10 \times a_3 + a_4)$ as a count of seconds in the generated time value. In the following description, the symbol "←" in the midst of a first variable and a second variable or a constant signifies that the value of the second variable or constant is assigned to the first variable. The processor 10 orderly performs $a_4 \leftarrow a_3$, $a_3 \leftarrow a_2$, $a_2 \leftarrow a_1$, and $a_1 \leftarrow 0$ to complete a right shift of a time value, and orderly performs $a_1 \leftarrow a_2$, $a_2 \leftarrow a_3$, $a_3 \leftarrow a_4$, and $a_4 \leftarrow 0$ to complete a left shift of a time value. When receiving a digit "3" in the step S300, the processor 10 performs $a_1 \leftarrow 3$, and accordingly generates a time value "30:00" for playback positioning. The processor 10 compares the time value "30:00" with the total playback time of the audio data 70 "3:45", and determines that the generated time value "30:00" is greater than the total playback time of the audio data 70 "3:45". The processor 10 may accordingly right shift the time value "30:00" to generate a time value "03:00" in the step S304 and an address corresponding to the time value "03:00" in the step S306. When subsequently receiving a digit "2" in the step S307, the processor 10 performs $a_2 \leftarrow 2$, and accordingly generates a time value "32:00" from the subsequently received digits "3" and "2". The processor 10 compares the time value "32:00" with the total playback time of the audio data 70 "3:45", and determines that the generated time value "32:00" is greater than the total playback time of the audio data 70 "3:45". The processor 10 may accordingly right shift the time value "32:00" to generate a time value "03:20" in the step S310 and an address corresponding to the time value "03:20" in the step S306.

Alternatively, when receiving a digit "5" in the step S307 following a digit "3", the processor 10 performs $a_2 \leftarrow 5$, and accordingly generates a time value "35:00" from the subsequently received digits "3" and "5". The processor 10 compares the time value "35:00" with the total playback time "3:45" of the audio data 70, and determines that the generated time value "35:00" is greater than the total playback time of the audio data 70 "3:45". The processor 10 may accordingly right shift the time value "35:00" to generate a time value "03:50" in the step S310 and compare the time value "03:50" with the total playback time of the audio data 70 "3:45", and determines that the generated time value "03:50" is still greater than the total playback time of the audio data 70 "3:45". The processor 10 may further right shift the time value "03:50" to generate a time value "00:35" in the step S310 and an address corresponding to the time value "00:35" in the step S306.

The first embodiment of the positioning method refers to playback time to locate a position in the audio data 70. Alternative embodiments of the positioning method interpreting the audio data 70 as comprising an arbitrary number of audio segments are detailed as follows.

2.2 Second Exemplary Embodiment of the Positioning Method

Figure 3C:
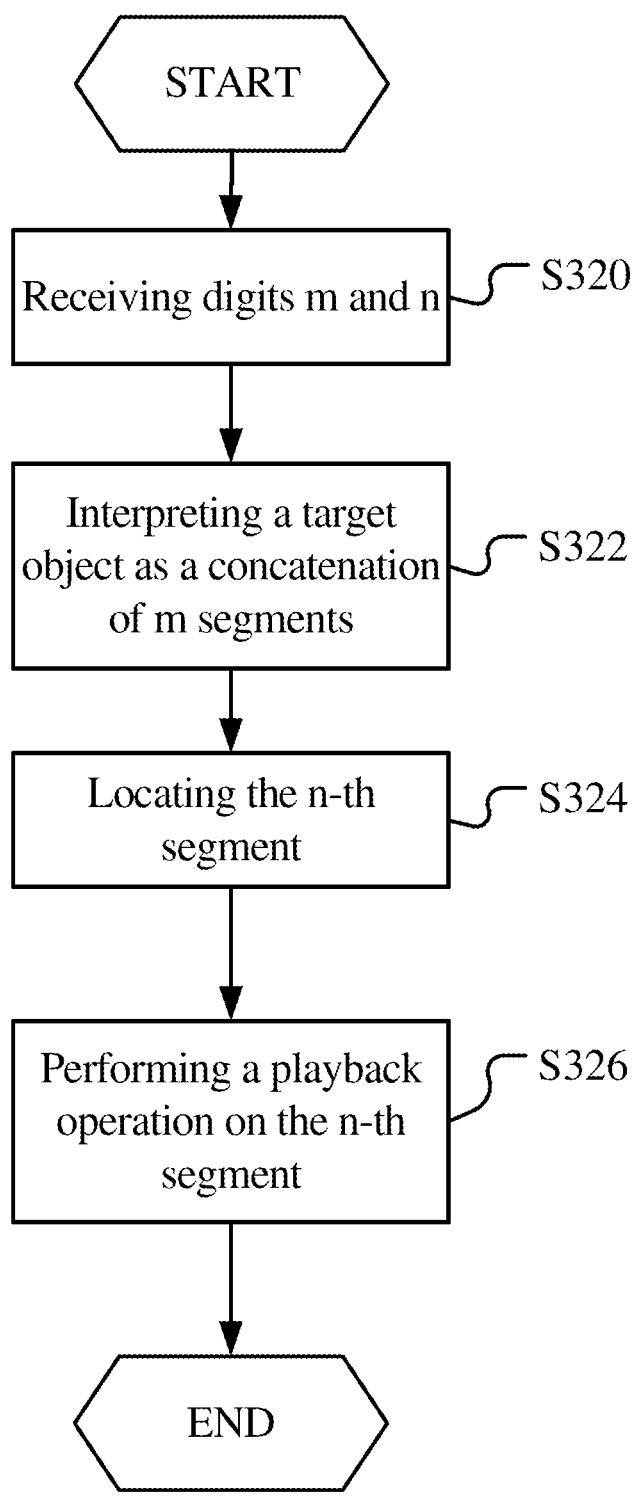

With reference to FIG. 3C, the electronic device system 100 executes the second exemplary embodiment of the positioning method to an active GUI element shown on the display 30. For example, when a volume control bar is the active GUI element of the electronic device system 100, the processor 10 focuses on the volume control bar as the target object and applies the method to the volume control bar to locate a target volume thereon. Similarly, when a playback speed control GUI is the active GUI element of the electronic device system 100, the processor 10 applies the method to the playback speed control GUI to locate a target playback speed thereon. When a scroll bar of a playlist is the active GUI element of the electronic device system 100, the processor 10 applies the method to the scroll bar to locate a target segment thereof. The following example is provided assuming a progress bar of the audio data 70 is the active GUI element. The progress bar is representative of the audio data 70, so that directly applying the method to the audio data 70 to locate a target position or a target segment thereon, the processor 10 may accordingly locate a corresponding target position or segment on the progress bar. Operations on a representative of a target object (e.g., the progress bar) during execution of the positioning method correspond to operations on the target object (e.g., the audio data 70). Alternatively, the processor 10 may apply the method to the progress bar to locate a target position or a target segment on the progress bar and accordingly locate a corresponding target position or segment of the audio data 70. The processor 10 may apply the method to the audio data 70 and the progress bar thereof in parallel, for example, through synchronously executed threads or processes.

Figure 5:
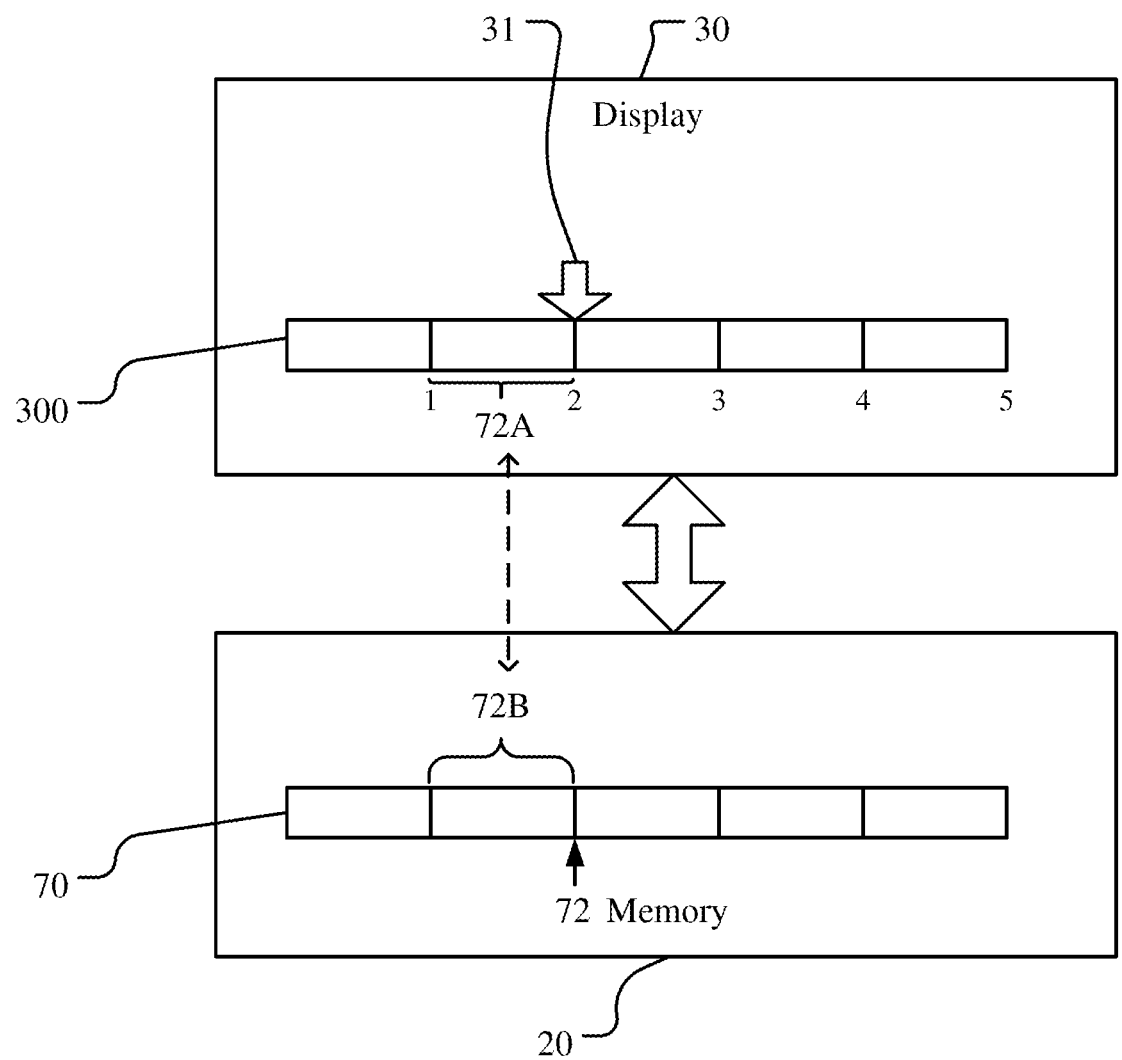
FIGS. 5-8 are schematic diagrams showing exemplary operations of a second embodiment of the disclosed method.

The processor 10 receives a first digit m and a second digit n from the input device 40 (step S320) and interprets target object (e.g., the audio data 70) as being a concatenation of m constituent audio segments in response to the digit m (step S322). Each segment has length D/m. With reference to FIG. 5, if m=5 and n=2, the processor 10 interprets the audio data 70 as being a concatenation of 5 constituent segments, wherein the first digit m specifies the number of the constituent segments in the audio data 70. The processor 10 may divide the length D of the audio data 70 by 5, the first digit, utilize the D/5 as new unit of playback skipping operations, and obtain addresses corresponding to playback time 0, D/5, 2D/5, 3D/5, 4D/5, and 5D/5 that delimit the five segments, each having length D/5

The processor 10 locates the n-th segment in the m segments in response to the second digit n (step S324). With reference to FIG. 5, if m=5 and n=2, the processor 10 locates the $2^{nd}$ segment 72B in the audio data 70, and displays an icon 31 to indicate the end of segment 72A in a progress bar 300 corresponding to the end of the segment 72B, wherein the second digit specifies the segment to be located.

The processor 10 performs a playback operation on the located n-th segment (step S326). As shown in FIG. 5, in the step S326, the processor 10 may, for example, begin playing the audio data 70 from an end position 72 of the located segment, and the icon 31 indicates a position on the progress bar 300 corresponding to the position 72. The processor 10 may alternatively begin playing the audio data 70 from a mid position of the located segment.

Figure 6:
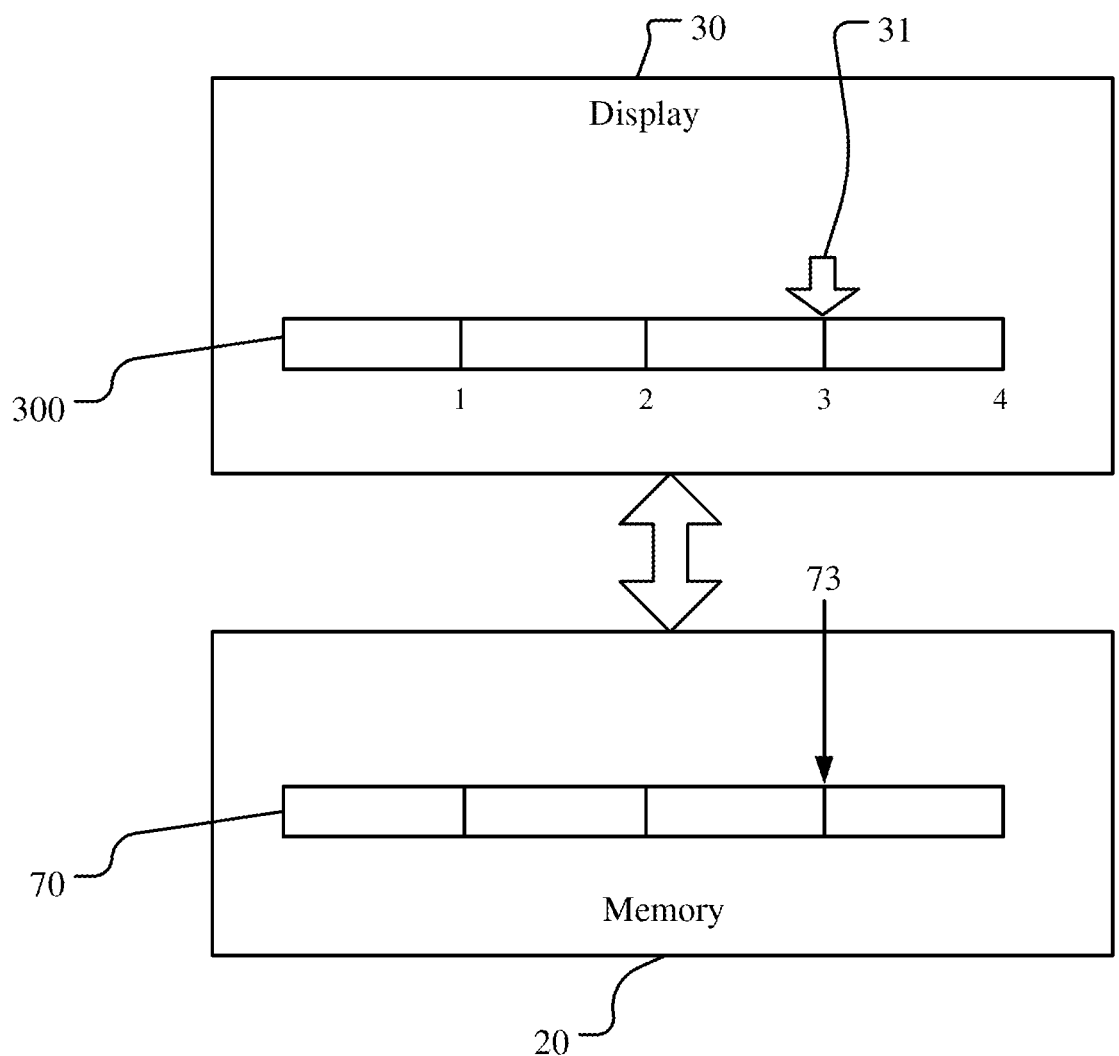

After the step S326, when receiving another set of digits, the processor 10 may repeat steps S320-S326 in the FIG. 3C for the set of digits. With reference to FIG. 6, if m=4 and n=3, the processor 10 interprets the audio data 70 as being a concatenation of 4 audio segments and the progress bar 300 as being a concatenation of 4 progress bar segments, and locates the $3^{rd}$ audio segment in the audio data 70 and the $3^{rd}$ progress bar segment in the progress bar 300. The processor 10 may also differentiate, by color, the $1^{st}$ to $3^{rd}$ progress bar segments from the $4^{th}$ progress bar segment.

An audio segment corresponding to the progress bar segment indicated by the icon 31 is referred to as a selected audio segment. The processor 10 may move the icon to the right or left segment of the located segment in response to operations of a direction key or a touch panel, and thus selecting instead a segment adjacent to the located segment. A selected segment in a different target object may be similarly changed in response to operations of the input device 40. During audio playback, changing assignment of a selected segment from an originally selected segment to a right adjacent segment thereof, such as by activation of point 219a, for example, is equivalent to a forward skipping operation. Changing assignment of a selected segment from an originally selected segment to a left adjacent segment thereof, such as by activation of point 221a, for example, is equivalent to a backward skipping operation. The processor 10 may utilize the second embodiment of the positioning method to change the basic unit of forward or backward skipping.

In the example of FIG. 5, when the $2^{nd}$ segment 72B serves as the selected segment, the processor 10 may treat the segment 72B as a new target object and further interpret the segment 72B as being a concatenation of m constituent sub-segments, each having length $D/m^2$. For example, in reiteration of the step S322 for further interpretation, the processor 10 divides the length D/5 of the segment 72B by 5, utilizes the quotient thereof as a new unit of playback skipping, and obtain addresses corresponding to playback times listed in the following to delimit sub-segments:

$$\left(\frac{D}{5}+0\right), \left(\frac{D}{5}+\frac{D}{5\times 5}\right), \left(\frac{D}{5}+\frac{2D}{5\times 5}\right),$$
$$\left(\frac{D}{5}+\frac{3D}{5\times 5}\right), \left(\frac{D}{5}+\frac{4D}{5\times 5}\right), \text{ and}$$
$$\left(\frac{D}{5}+\frac{5D}{5\times 5}\right)$$

Figure 7:
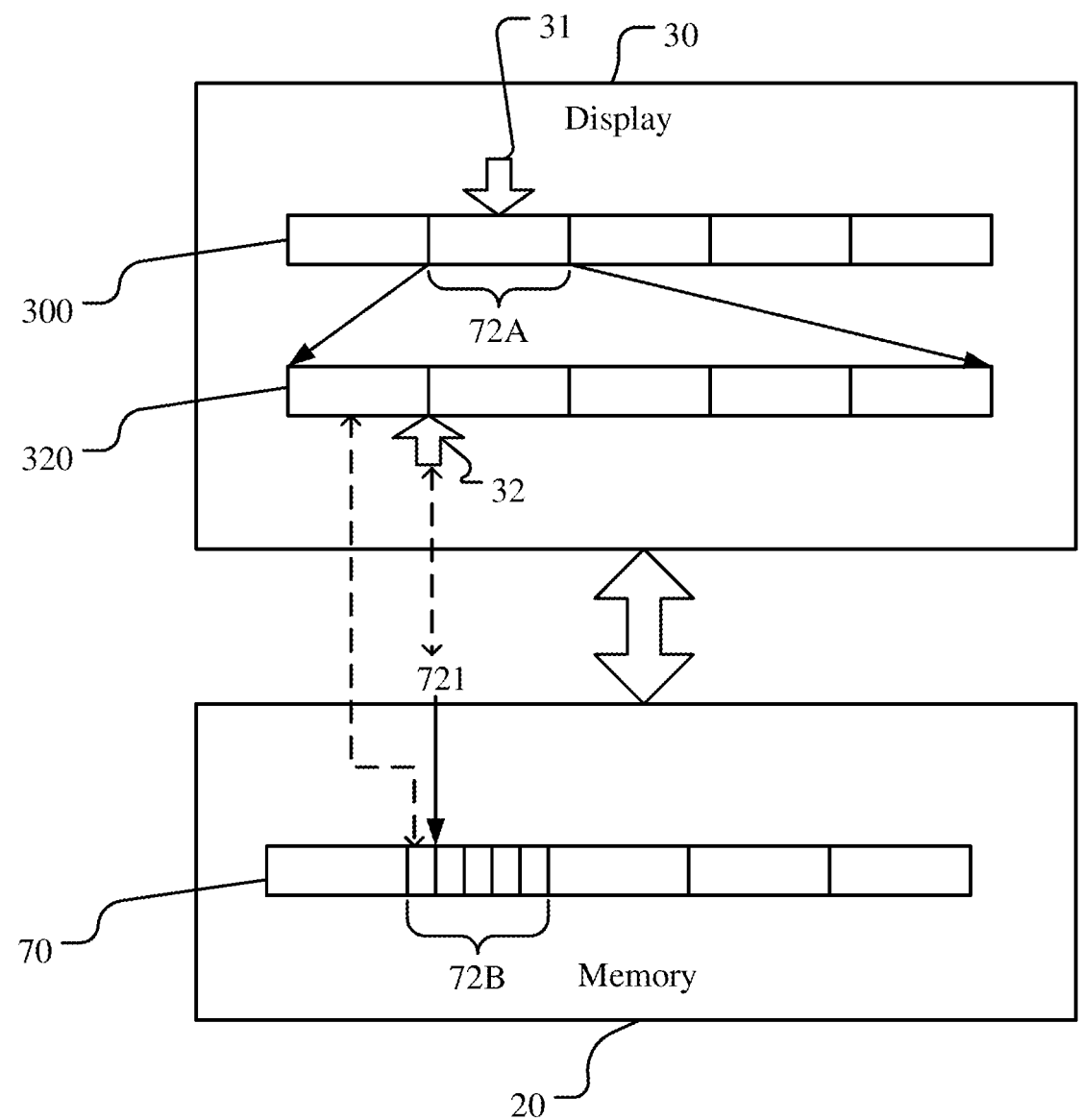

As shown in FIG. 7, a progress bar 320 represents the progress bar segment 72A and the audio segment 72B. The processor 10 further interprets the progress bar segment 72A as being a concatenation of five progress bar sub-segments and the audio segment 72B as a concatenation of five audio sub-segments. Five segments in the progress bar 320 represent the five audio sub-segments in the segment 72B. A sub-segment indicated by an icon 32 in the FIG. 7 is referred to as a selected sub-segment, wherein the icon 32 corresponds to a position 721 in the audio segment 72B. Similarly, an input device 40, such as the key 217, may be utilized to move the icon 32, thus changing the assignment of a selected sub-segment.

Figure 2B:
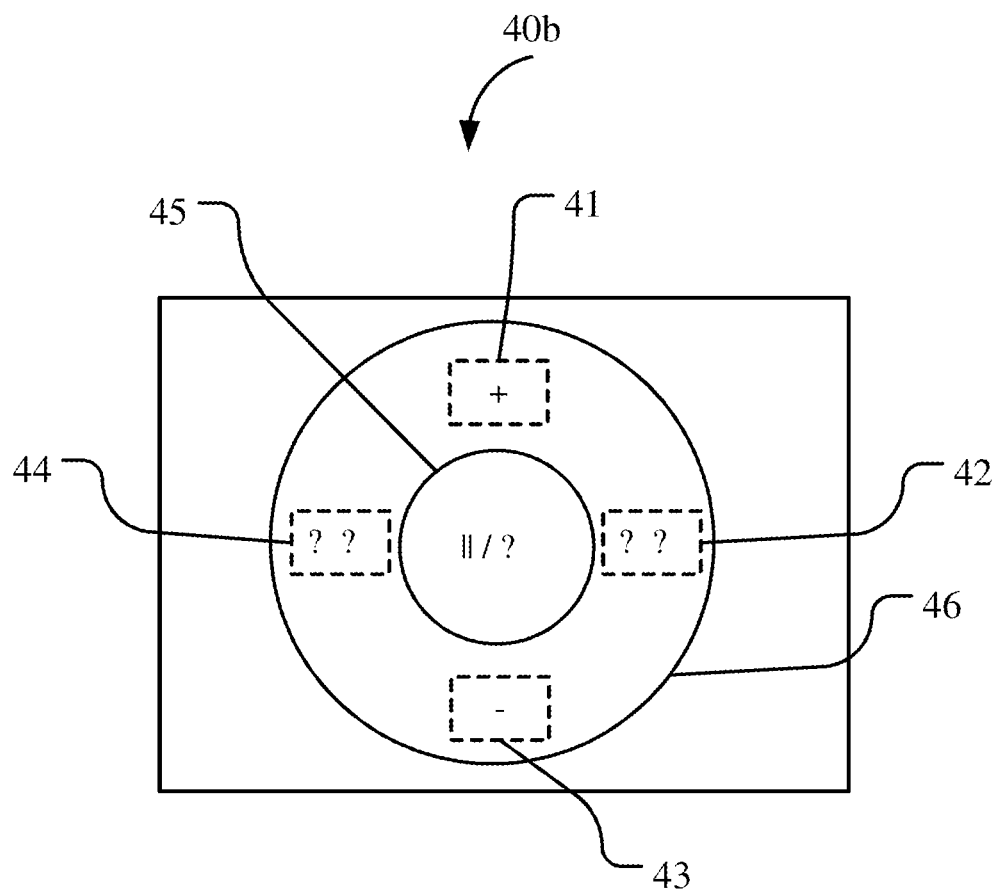

A device without numeric keys may utilize a direction key, a forward skipping key, or a backward skipping key to select a segment and/or a sub-segment in a target object. FIG. 2B shows an input device 40b, wherein a key 42 is operable to trigger playback forward skipping, a key 44 to trigger playback backward skipping, and a key 45 to activate or suspend audio playback. A touch sensitive device 46 as shown in FIG. 2B is structured in a form of a wheel. A clockwise movement on the device 46 may also trigger playback forward skipping, and a counter-clockwise movement on the device 46 may also trigger playback backward skipping. The memory 20 may store a predetermined number y specifying the number of segments to be interpreted in the audio data 70, wherein the number y is a positive integer. When the key 42 is activated in the audio playing mode, the processor 10 locates the first segment among y segments of the audio data 70 in response to a keystroke of the key 42, locates the second segment adjacent to the first segment on the right side thereof in response to a second keystroke of the key 42, locates the first segment adjacent to the second segment on the left side thereof in response to a second keystroke of the key 44, and interprets a located segment as being a concatenation of a plurality of segments (e.g., y segments) in response to a keystroke on a key 41 or 43.

2.3 Third Exemplary Embodiment of the Positioning Method

Figure 3D:
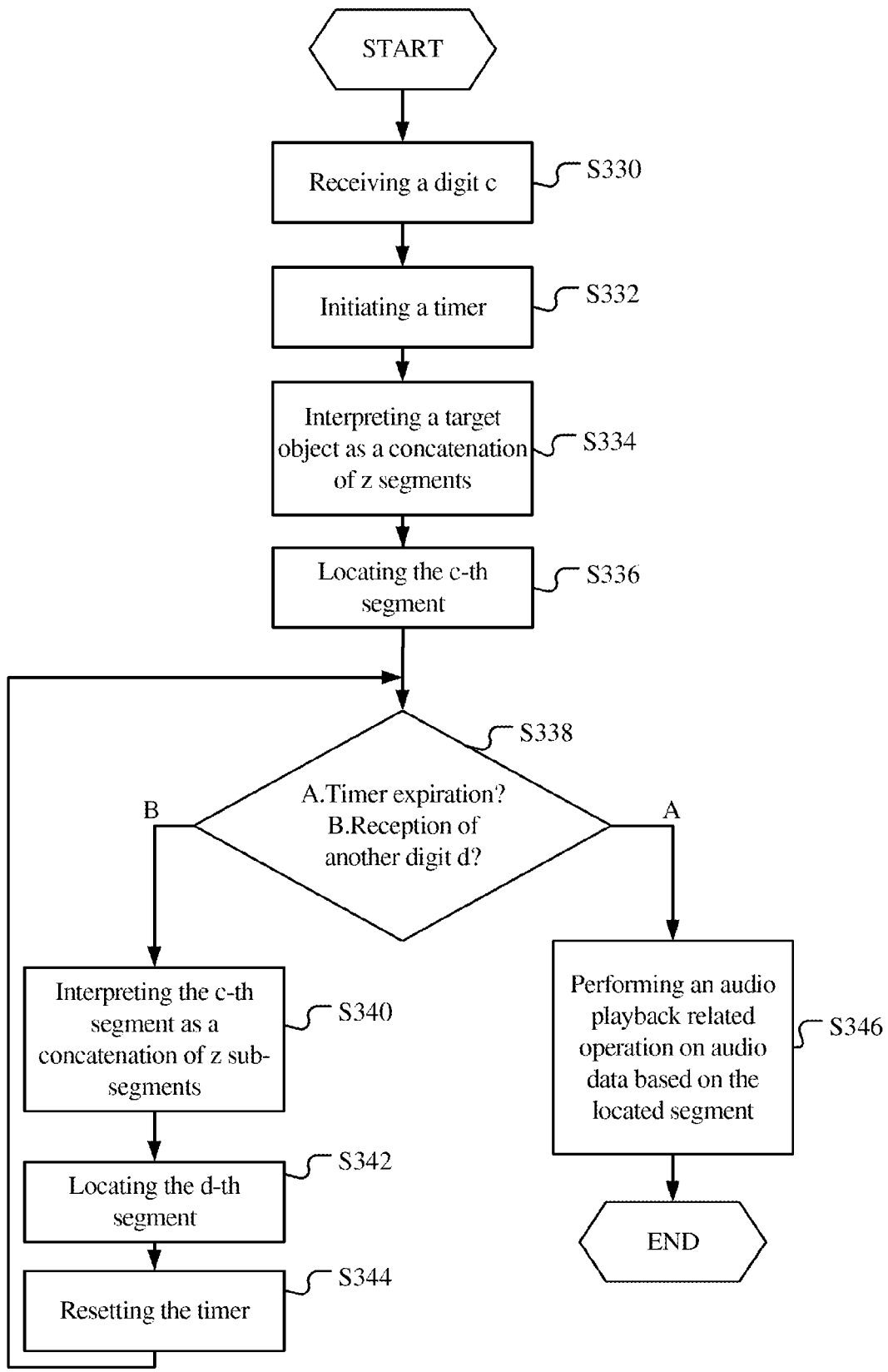

FIG. 3D shows a third embodiment of the positioning method executed by the electronic device system 100. Although the audio data 70 is utilized as a target object of the third embodiment of the positioning method in the following description, the method may be applied to various target objects, such as a progress bar, a volume control bar, a playback speed control GUI, and a scroll bar of a playlist. The memory 20 may store a predetermined number z specifying the number of segments to be interpreted as comprising the audio data 70, wherein the number z is a positive integer greater than one.

Figure 9:
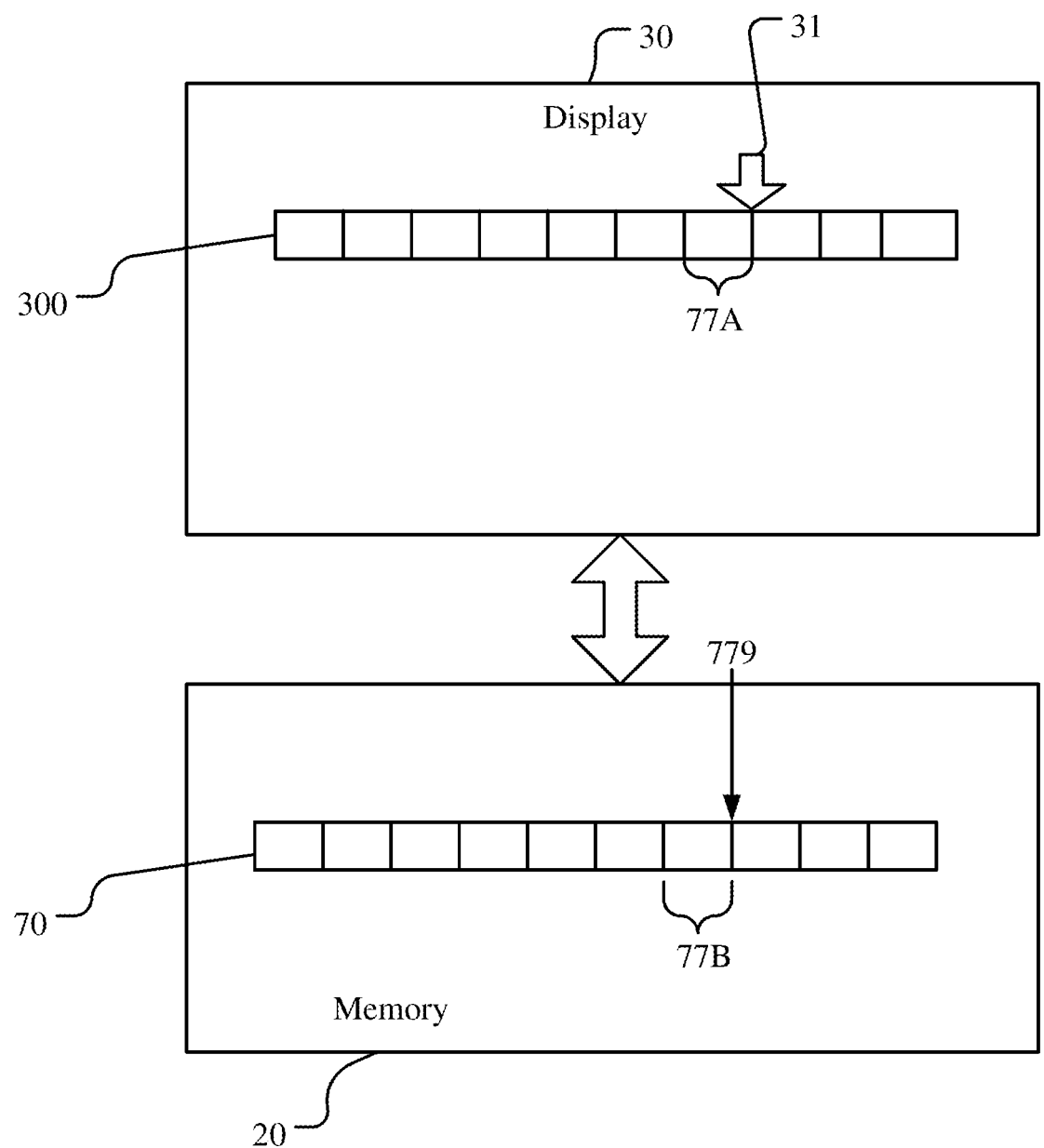
FIGS. 9-10 are schematic diagrams showing exemplary operations of a third embodiment of the disclosed method.

The processor 10 receives a digit c from the input device 40 (step S330) and initiates the timer 50 to keep a predetermined period of time (step S332). The processor 10 interprets the audio data 70 as being a concatenation of z constituent audio segments (step S334) and locates the c-th segment thereof in response to the received digit c (step S336), wherein length of each segment is D/z. The processor 10 divides the length D of the audio data 70 by z, and utilizes D/z as a new unit of playback skipping operations. As shown in FIG. 9, for example, if z=10 and c=7, the processor 10 interprets the audio data 70 as ten audio segments each with length D/10, divides the progress bar 300 into ten progress bar segments, and locates audio segment 77B and progress bar segment 77A corresponding thereto in response to the digit c, wherein the icon 31 indicates an ending position of the progress bar segment 77A. When the progress bar 300 is the active GUI element of the electronic device system 100, the processor 10 may utilize the progress bar 300 as a target object, divide the progress bar 300 into ten progress bar segments, and locate the progress bar segment 77A. The processor 10 then accordingly performs corresponding operations on the audio data 70 in response to the processing of the progress bar 300. Specifically, the processor 10 interprets the audio data 70 as ten audio segments each with length D/10, and locate audio segment 77B corresponding to the progress bar segment 77A. A position 779 corresponds to a position indicated by the icon 31.

The processor 10 determines if the timer 50 expires (event A), and if another digit d is received from the input device 40 before the timer 50 expires (event B) (step S338).

Figure 10:
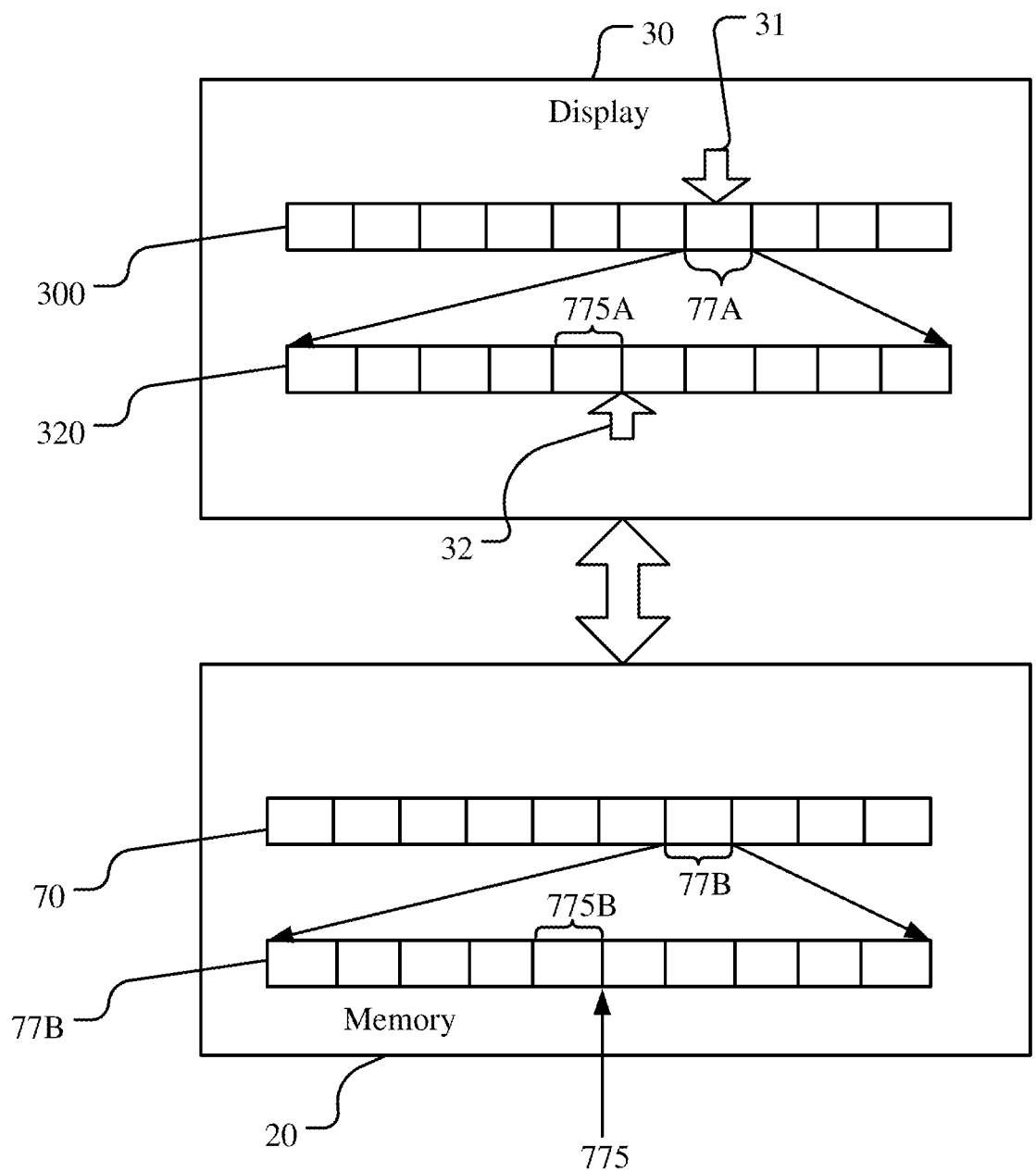

In the step S338, if the digit d is received from the input device 40 before the timer 50 expires (event B), the processor 10 further interprets the located audio segment as being a concatenation of z sub-segments (step S340), locates the d-th sub-segment thereof (step S342), and resets the timer 50 in response to the reception of the digit d (step S344). A length of each sub-segment is $D/z^2$. The processor 10 utilizes the length of one sub-segment $D/z^2$ as a new unit of playback skipping. In the example of FIG. 9, if z=10 and d=5, the processor 10 further interprets the located $7^{th}$ audio segment as being a concatenation of ten sub-segments and locates the 5-th sub-segment thereof. As shown in FIG. 10, the progress bar 320 represents the progress bar segment 77A corresponding to the audio segment 77B. The processor 10 also divides the progress bar 320 into ten sub-segments and locates the $5^{th}$ progress bar sub-segment 775A corresponding to audio sub-segment 775B. The audio sub-segment 775B may be further interpreted as being a concatenation of much smaller segments by repeating steps in FIG. 3D.

If the timer 50 expires (event A), the processor 10 performs a playback operation on the located audio segment (step S346). In the example of FIG. 10, the processor 10 may begin playing the audio data 70 from an end position 775 of the segment 775B.

A device without numeric keys may receive an operation originally designed to move a cursor or an icon upward or downward to perform the division of the progress bar 300 or a progress bar segment and corresponding operations thereof on the audio data 70. Such device may also utilize a direction key, a forward skipping key, or a backward skipping key to locate or select a segment in a target object.

2.4 Fourth Exemplary Embodiment of the Positioning Method

Figure 3E:
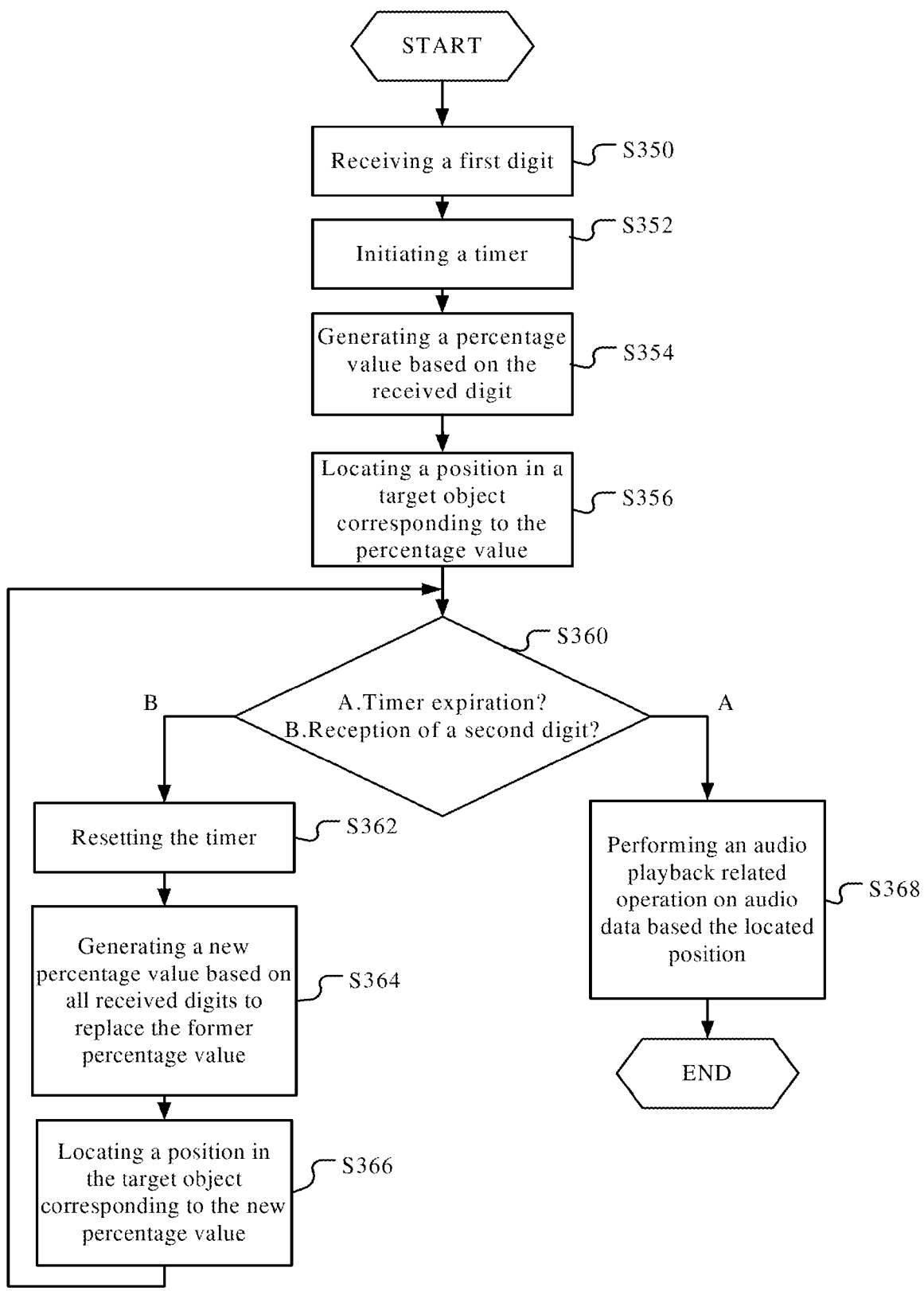

FIG. 3E shows a fourth embodiment of the positioning method executed by the electronic device system 100. Although the audio data 70 is utilized as a target object of the fourth embodiment of the positioning method in the following description, the method may be applied to various target objects, such as a progress bar, a volume control bar, a playback speed control GUI, and a scroll bar of a playlist.

The electronic device system 100 comprises variables $a_1$, $a_2$, $a_3$, ... and $a_n$, each with default value "0". The processor 10 orderly stores each received digit from the input device 40 as one of the variables $a_1$, $a_2$, $a_3$, ... and $a_n$. With reference to FIG. 3E, the processor 10 receives a first digit e and stores the digit e into variable a1, that is $a_1 \leftarrow e$ (step S350), and initiates the timer 50 to keep a predetermined period of time (step S352). The processor 10 generates a percentage based on the digit e and an address corresponding to the percentage (step S354), and locates a position on the audio data 70 corresponding to the percentage (step S356). For example, the processor 10 obtains the percentage from the formula:

$$x = 1\% \times \sum_{i=1}^{n} 10^{2-i} \times a_i \quad (1)$$

Figure 11:
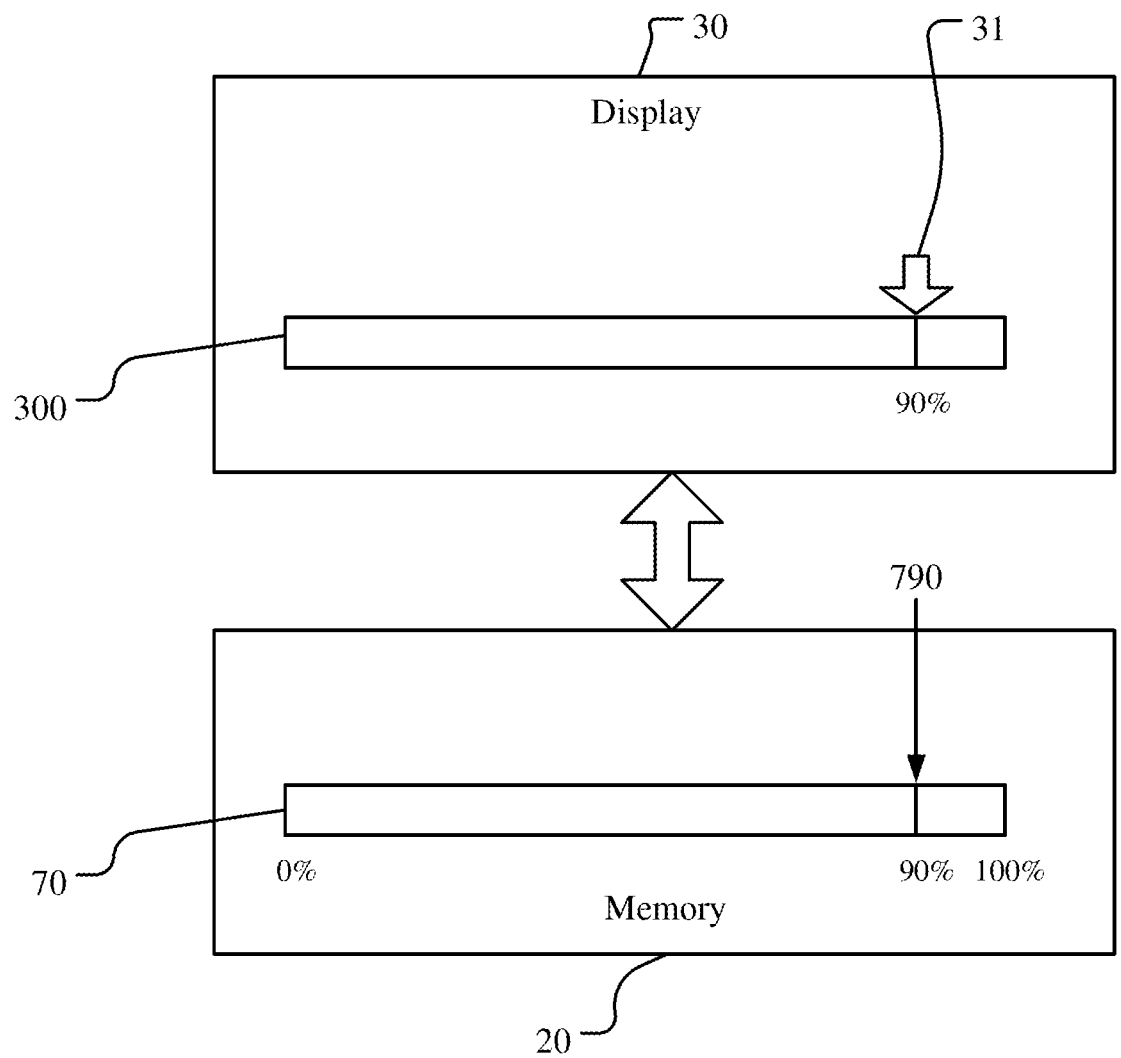
FIG. 11 is a schematic diagram showing exemplary operations of a fourth embodiment of the disclosed method.

If the received first digit e=9, the processor 10 generates 90% based on the formula (1) and the first digit e. As shown in FIG. 11, a ratio of playback time corresponding to a position 790 to total playback time of the audio data 70 is substantially equal to the generated value of 90%. The processor 10 generates an address corresponding to 90% and locates a position on the audio data 70 based on the address.

The processor 10 determines if the timer 50 expires (event A), and if a second digit f is received from the input device 40 before the timer 50 expires (event B) (step S360). When receiving the second digit f from the input device 40 before the timer 50 expires (event B), the processor 10 store the second digit f in variable $a_2$, that is $a_2 \leftarrow f$, and resets the timer 50 (step S362), and generates a new percentage in substitution for the previously generated percentage based on all received digits and generates an address corresponding to the new percentage (step S364).

For example, if e=9 and f=5, the new percentage m $$\begin{aligned} m_{new} &= 1\% \times (10^{2-1} a_1 + 10^{2-2} a_2 + 10^{2-3} a_3 + \ldots 10^{2-n} a_n) \\ &= 1\% \times (10^1 \times 9 + 10^0 \times 5 + 10^{-1} \times 0 + \ldots 10^{2-n} \times 0) \\ &= 1\% \times (90 + 5 + 0 + \ldots 0) \\ &= 95\% \end{aligned}$$

if e=0 and f=5, the new percentage $m_{new}$:

$$m_{new} = 1\% \times (10^{2-1} a_1 + 10^{2-2} a_2 + 10^{2-3} a_3 + \ldots 10^{2-n} a_n)$$
$$= 1\% \times (10^1 \times 0 + 10^0 \times 5 + 10^{-1} \times 0 + \ldots 10^{2-n} \times 0)$$
$$= 1\% \times (0 + 5 + 0 + \ldots 0)$$
$$= 5\%$$

The processor 10 locates a position on the audio data 70 corresponding to the new percentage (step S366) and repeat step S360.

If the timer 50 expires (event A), the processor 10 performs a playback operation on the located position (step S368).

3. VARIATION OF EMBODIMENTS

Figure 8:
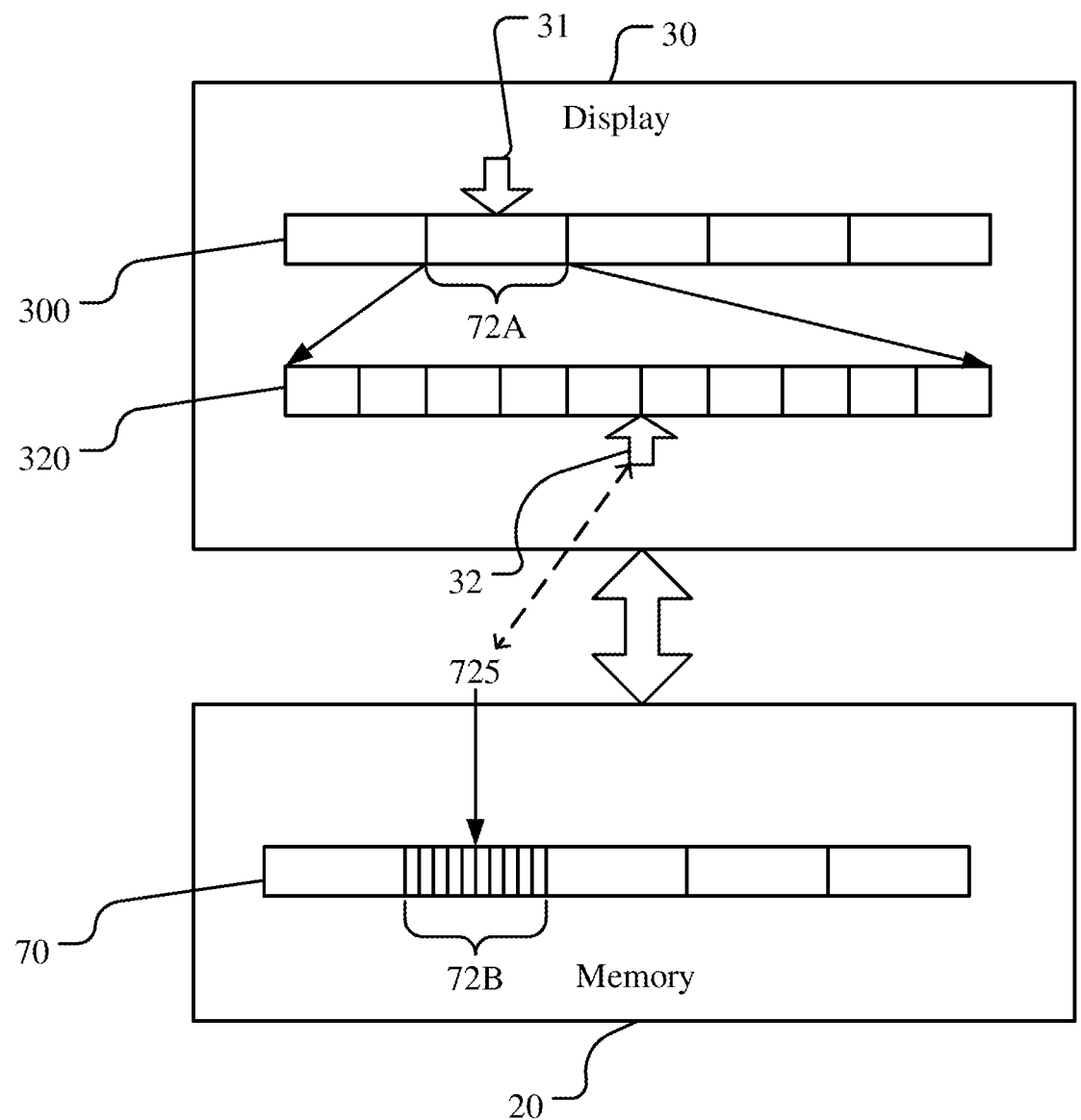

Transition of a target object segment or a representative GUI thereof into a plurality of sub-segments on the display 30 such as shown in FIGS. 7, 8, and 10 may be triggered by a movement track on a touch sensitive device or a pointing device. For example, the movement track extends from a beginning point on a located segment in the progress bar 300 to an ending point on the progress bar 320. The processor 10 may determine whether to activate the transition and display the progress bar 320 based on an angle between the progress bar 300 and a vector determined by the beginning and ending points. For example, the processor 10 activates the transition and displays the progress bar 320 when an angle between the vector and the progress bar 300 is greater than an angle between the vector and a vector perpendicular to the progress bar 300. The processor 10 may control the display 30 to show the transition by magnifying the segment or a representative GUI thereof on the display 30 rather than displaying an additional progress bar, such as the progress bar 320. The processor 10 may reverse the transition by miniaturizing the segment or a representative GUI thereof on the display 30 in response to another movement track.

3.1 Alternative Embodiments of the Positioning Method

Figure 12:
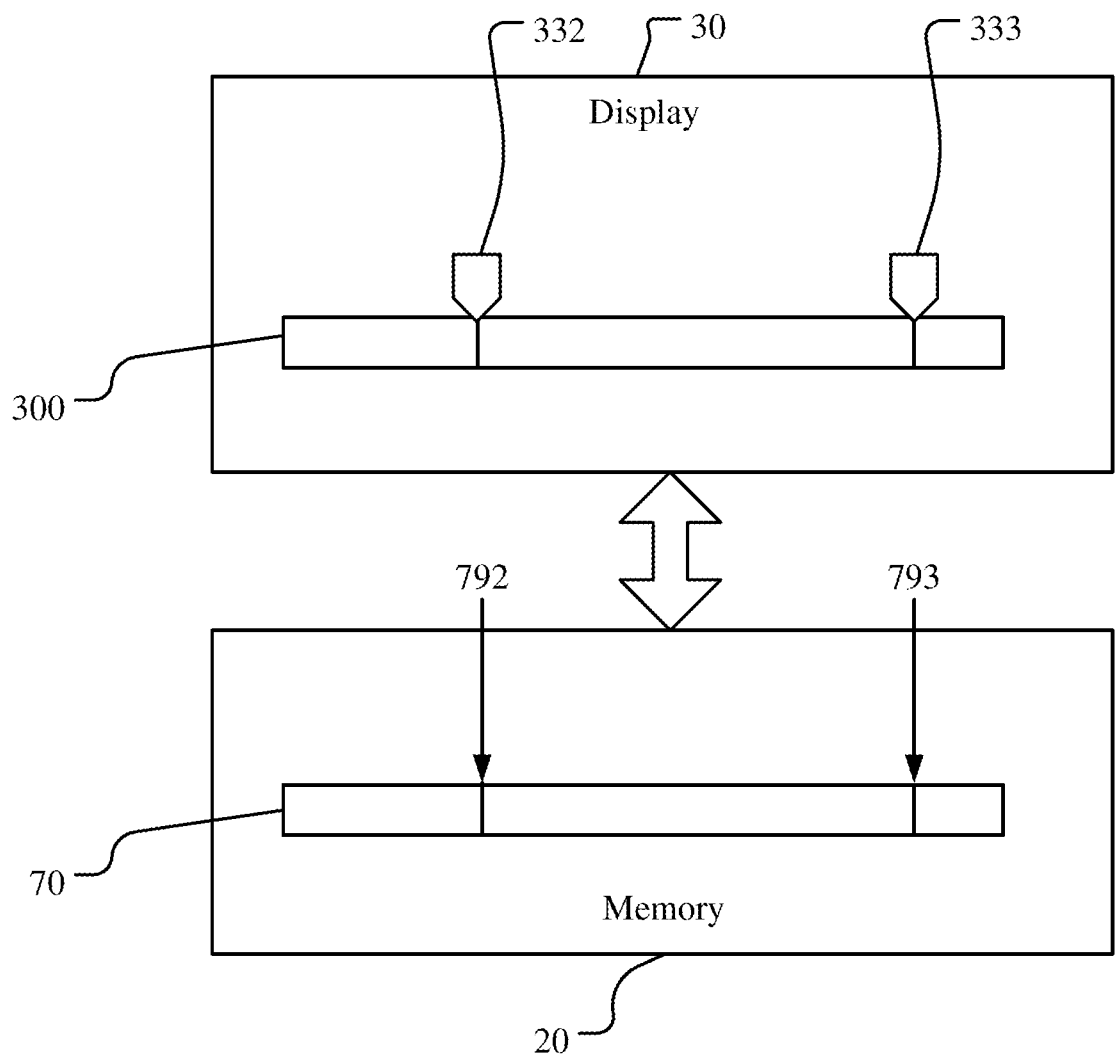
FIG. 12 is a schematic diagram showing exemplary operations of bookmark setting based on the disclosed method.

The processor 10 may utilize any of the embodiments of the positioning method to locate a position on the audio data 70 and set a bookmark thereon. When receiving a bookmark setting operation on a specific position in a progress bar, the processor 10 accordingly sets a bookmark on a position of the audio data 70 corresponding to the specific position in the progress bar. After setting a bookmark on a specific position of the audio data 70, the processor 10 may display a bookmark on a position in the progress bar corresponding to the specific position of the audio data 70. Bookmark settings may be triggered by a click operation of a pointing device, or a touch operation on a touch sensitive device. The processor 10 may switch audio playback to a target position where a bookmark is set in response to an operation from the input device 40. Multiple bookmarks may be set for a single audio title. As shown in FIG. 12, positions 792 and 793 are located through the disclosed positioning method to be associated with bookmarks 332 and 333.

The disclosed positioning methods may be applied to an audio segment delimited by two bookmarks. Since the disclosed positioning method generates addresses of target positions or segments based on length of a target object, the processor 10 may locate target positions or segments in the audio segment delimited by two bookmarks based on length thereof.

The electronic device system 100 may record the located positions or segments, addresses or bookmarks thereof in the memory 20 for subsequent utilization for various functions. In an example, the electronic device system 100 comprises a mobile phone, when receiving an incoming telephone call, the processor 10 outputs a ring tone through a loudspeaker by randomly retrieving and playing a previously-located position or segment in the audio data 70 utilizing recorded information for the ring function. The recorded information for the ring function may comprise addresses or bookmarks corresponding to positions or segments in the audio data 70.

Digit input syntax may be variously defined for the positioning methods. For example, a symbol "#" may be utilized to delimit the digits m and n in the second embodiment of the positioning method. When receiving a long sequence of digits, the processor 10 may respectively utilize different portions in the sequence to position different target objects, such as the audio data 70, a volume control bar, and a playback speed control GUI. For example, when receiving a long digit sequence "51*41*32" with symbols "*" delimiting three digit strings therein, the processor 10 locates the first of five constituent audio segments in the audio data 70 in response to the first digit string "51", locates the end position of the first of four constituent segments in the volume control bar in response to the second digit string "41", locates the end position of the second of three constituent segments in the playback speed control GUI in response to the second digit string "32", and performs audio playback according to the located segment and positions. The recorded information for the ring function may also comprise the digit sequence. Positioning methods utilizing different portions in the digit sequence may comprise different embodiments of the positioning method.

The processor 10 may show options to trigger the respective embodiments of positioning methods on the display 30. Options of embodiments of the positioning method for respective types of target objects are marked with "V" in Table 1:

TABLE 1

| | Target object | | | | |
|---|---|---|---|---|---|
| Options | Audio data | Progress bar | Volume control bar | Playback speed control GUI | Playlist |
| 1st embodiment | V | V | | | |
| 2nd embodiment | V | V | V | V | V |
| 3rd embodiment | V | V | V | V | V |
| 4th embodiment | V | V | V | V | V |

In audio playing mode, the processor 10 may open a playlist, display a portion of the playlist in a window GUI element, selects and play a title in the displayed portion of the playlist, and skip playback of the title according to the positioning method. The positioning methods may be applied on presentation of a playlist in a window on the display 30. Arrangement or rankings of titles in a playlist may be based on rating of one or more attribute values of each title in the playlist. Rating of one or more attribute values of each title may be user-adjustable. Examples of rating operations are given in the following.

When receiving a movement track from the input device 40 (e.g., a touch panel), the processor 10 generates a rating value of a title upon which the movement track is applied based on projection of the movement track on an edge of a window. For example, the movement track may be generated from a touch panel, a touch display, a mouse, or a trackball.

Figure 13:
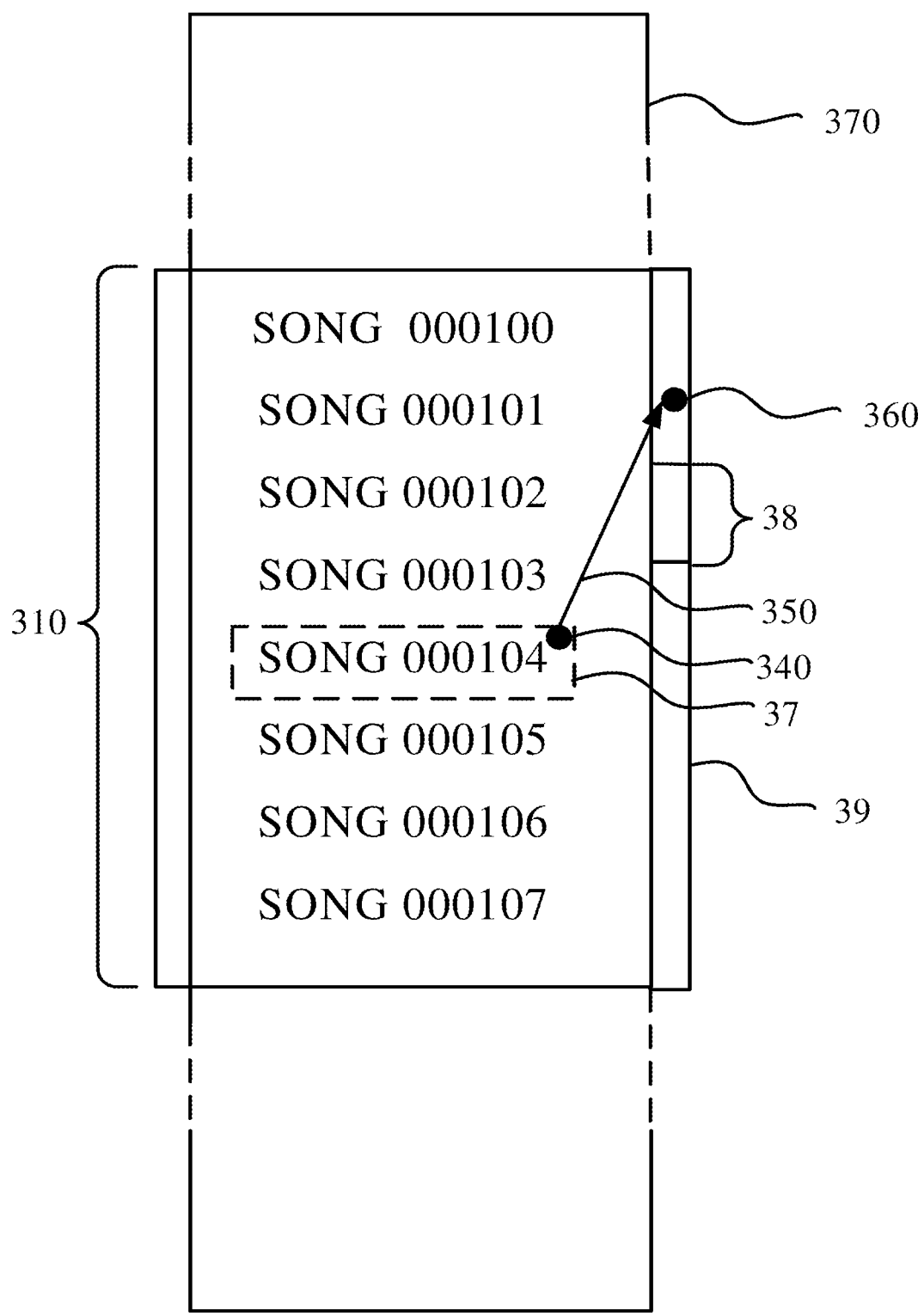
FIGS. 13-15 are schematic diagrams showing rating of audio data.

As shown in FIG. 13, the processor 10 receives a movement track 350 from the input device 40. A length of a scroll bar 39 represents the length of a playlist 370, and the position and length of a thumb 38 in the scroll bar 39 respectively represents the position of a window 310 related to the playlist 370 and a proportion of the number of titles in the window 310 to the total number of titles in the playlist 370. The track 350 begins from a point 340 in a GUI element 37 corresponding to a title "SONG000104" to a point 360 on the scroll bar 39 nearby a right edge of the window 310. The processor 10 generates a rating value of the title "SONG000104" based on the position of the point 360 on the edge of the window 310. The GUI element 37 may comprise an area showing text of the title "SONG000104" or an image area showing animated images of the title "SONG000104".

For example, assuming that the maximum and minimum rating values of a title are respectively M and m, the height of the window 310 is $H_1$, and a distance between the point 360 to the lower end of the window 310 is $h_1$. The processor 10 generates the rating value of the title "SONG000104" in response to the movement track 350 according to the following formula:

$$(M-m) \times h_1/H_1 \qquad (2)$$

The processor 10 may adjust a precision and a rounding of the rating value.

Figure 14:
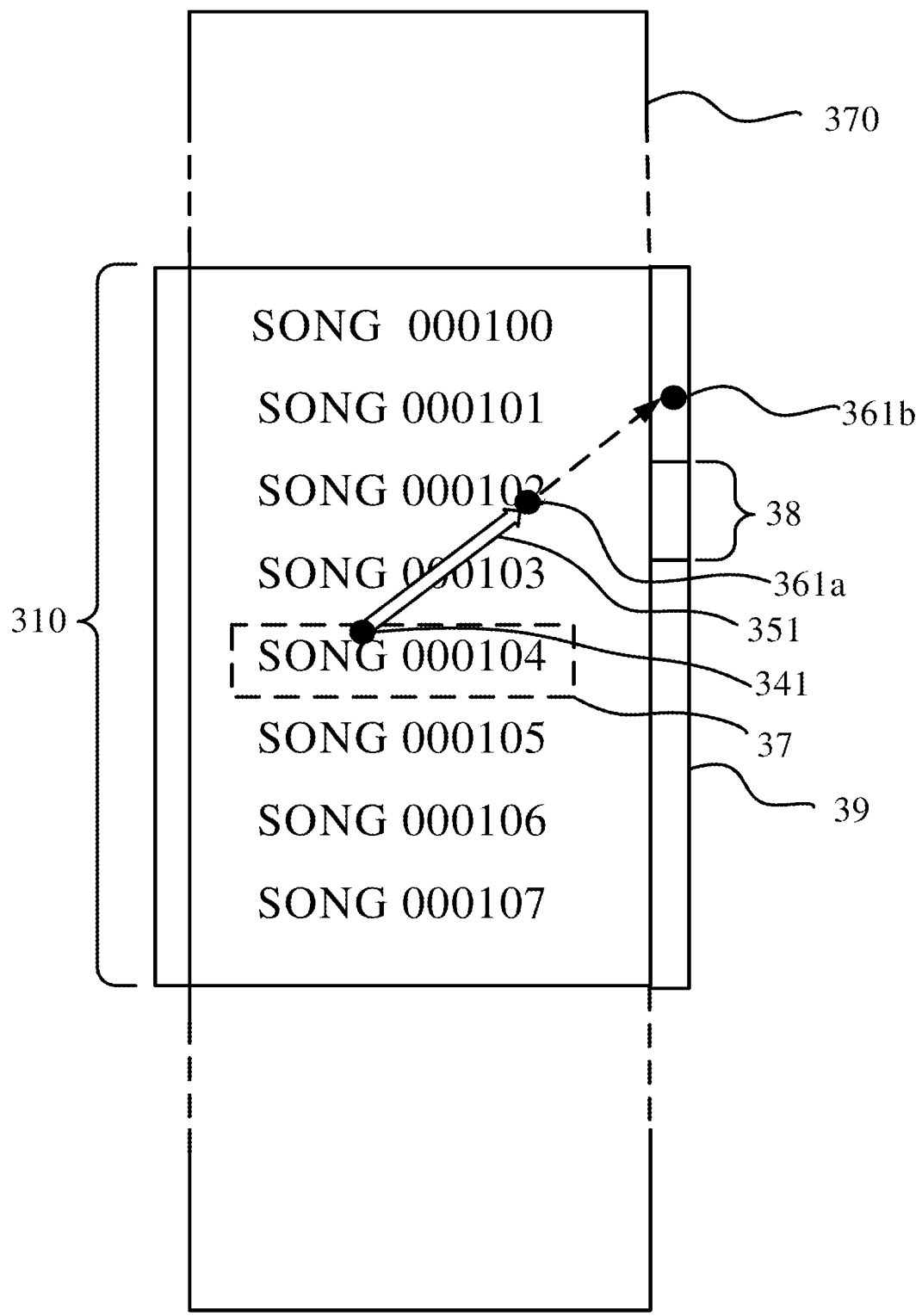

Alternatively, the ending point of a movement track is not required to be located on a scroll bar. As shown in FIG. 14, the processor 10 receives a movement track 351 from the input device 40. The track 351 begins from a point 341 in a GUI element 37 corresponding to a title "SONG000104" to a point 361a. A line determined by the points 341 and 361a extends to and crosses with the right edge of the window 310 on point 361b. The processor 10 generates a rating value of the title "SONG000104" based on the position of the point 361b on the edge of the window 310.

For example, assuming that the maximum and minimum rating values of a title are respectively M and m, the height of the window 310 is $H_1$, and a distance between the point 361b to the lower end of the window 310 is $h_1$. The processor 10 generates the rating value of the title "SONG000104" in response to the movement track 350 according to the following formula:

$$(M-m) \times h_1/H_1$$

Figure 15:
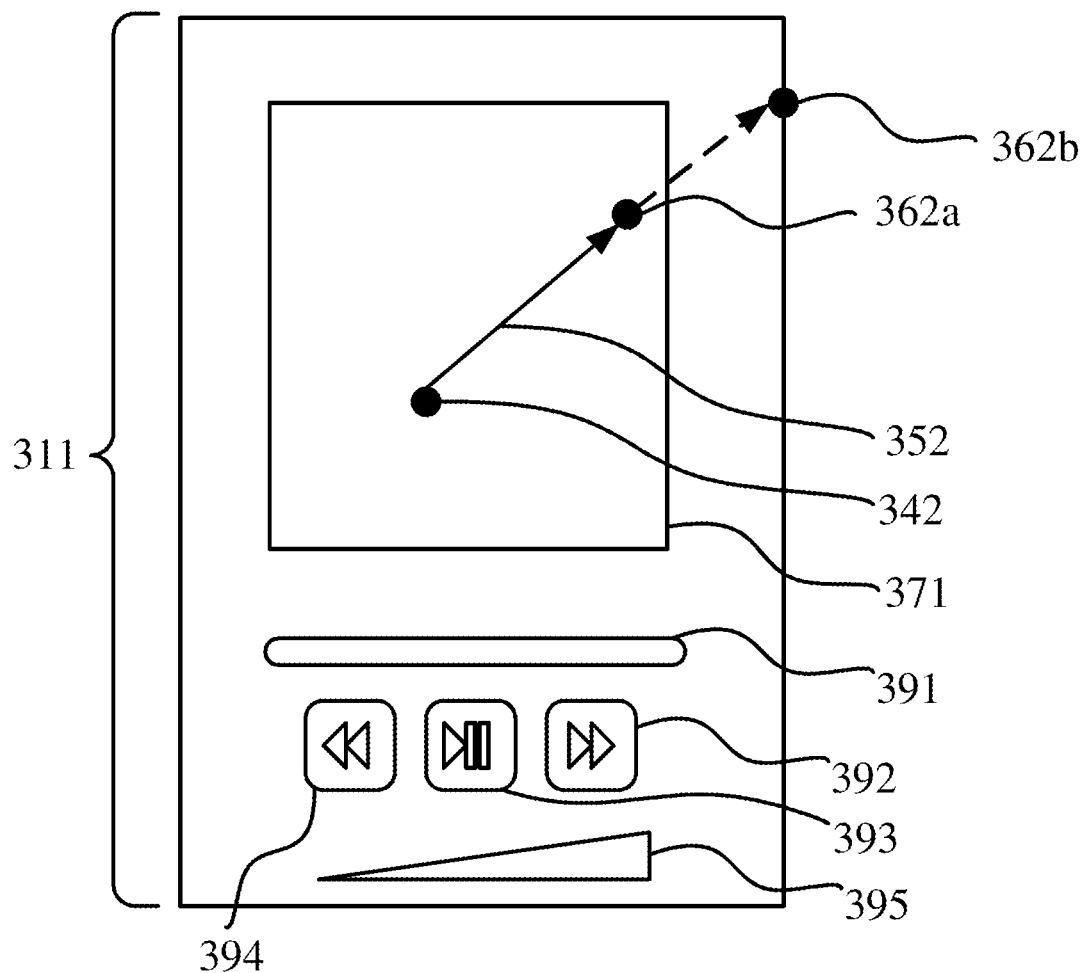

Alternatively, the processor 10 displays a player application to play the title. As shown in FIG. 15, the processor 10 displays a progress bar 391, keys 392-394, and a volume control bar 395 on the display 30. The key 393 triggers or suspends audio playback. The keys 392 and 394 respectively trigger forward and backward skipping of audio playback. The processor 10 receives a movement track 352 from the input device 40. The track 352 begins from a point 342 in a GUI element 371 corresponding to a title "SONG000104" to a point 362a. The GUI element 371 may comprise a text area showing text of the title "SONG000104" or an image area showing still or animated images of the title "SONG000104".

A line determined by the points 342 and 362a extends to and crosses with the right edge of a window 311 on point 362b. The processor 10 generates a rating value of the title "SONG000104" based on the position of the point 362b on the edge of the window 311. For example, assuming that the height of the window 311 is $H_2$, and a distance between the point 362b to the lower end of the window 311 is $h_2$. The processor 10 generates the rating value of the title "SONG000104" in response to the movement track 352 according to the following formula:

$$(M-m) \times h_2/H_2 \qquad (3)$$

The windows 310 and 311 may have different dimensions and may respectively be expanded to have the same size as the entire display area of the display 30.

Figure 16:
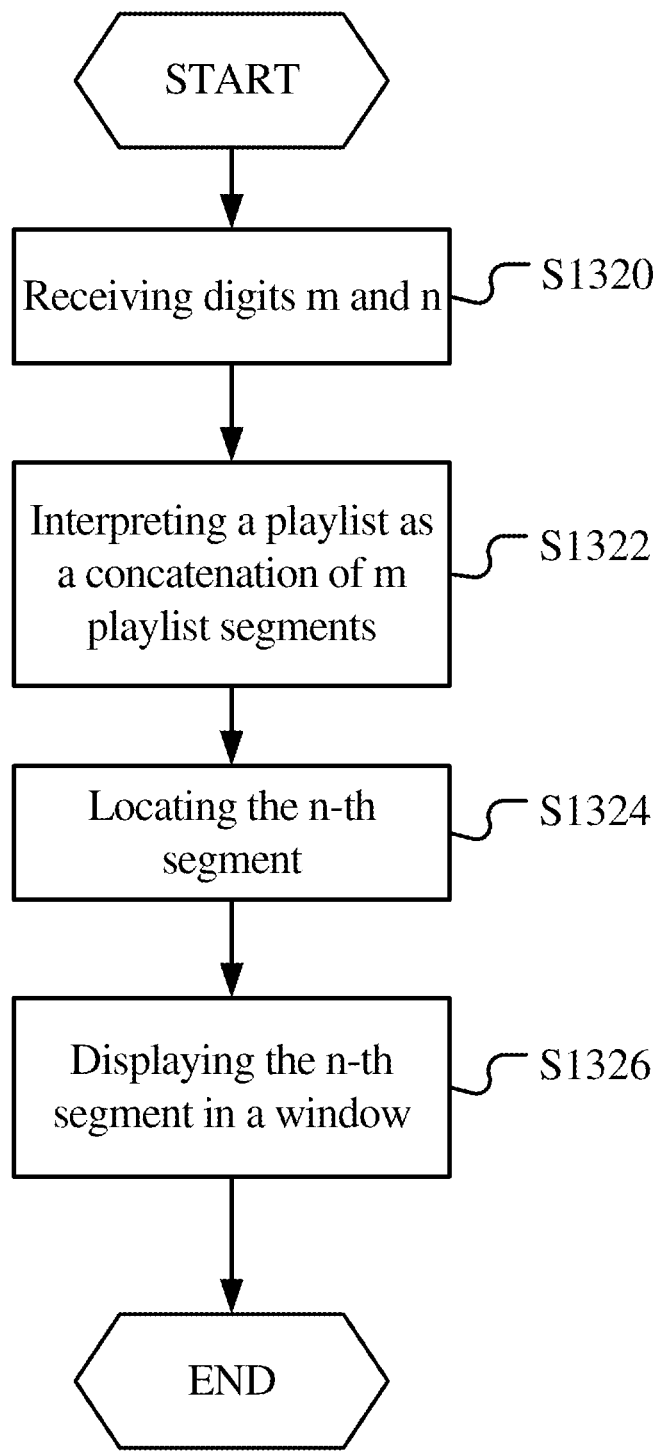
FIG. 16 is a flowchart showing an embodiment of the disclosed method applied to a playlist of audio data.

FIG. 16 shows an embodiment of the positioning method for a playlist. During display of a playlist, the processor 10 applies the positioning method to the playlist.

The processor 10 receives a first digit m and a second digit n from the input device 40 (step S1320) and interprets a playlist as being a concatenation of m constituent playlist segments in response to the digit m (step S1322). The processor 10 utilizes the integer portion in the quotient of division of the total length C of the playlist by m to be a new unit for scroll operations of the playlist. That is, the processor 10 limits the number of titles to be displayed in a window to $\lfloor C/m \rfloor$ or $\lceil C/m \rceil$. The processor 10 locates the n-th segment in the m playlist segments in response to the second digit n (step S1324). If m=8 and n=2, the processor 10 interprets the playlist as being a concatenation of 8 playlist segments, locates, and displays the second segment in the window 310. For example, if the playlist comprises 32 titles, the processor 10 obtains quotient 4 from 32/8, and limits the display of titles in a window to a maximum number of 4 titles after each scroll operation of the playlist.

The processor 10 displays the located playlist segment in a window on the display 30 (step S1326). The processor 10 may magnify or miniaturize appearance of the located playlist segment to fit the dimension of the window. The processor 10 may repeat the steps shown in FIG. 16 for each two digits received. With reference to FIG. 13, if the playlist comprises 32 titles, m=4 and n=3, the processor 10 interprets the playlist as being a concatenation of 4 playlist segments and displays the third playlist segment in the window 310.

Activation of points 218a and 220a in the direction key 217 may respectively trigger display of an upper and a lower adjacent playlist segment of the currently-displayed playlist segment. The electronic device system 100 may thus change the unit of playlist scrolling.

The processor 10 may further divide a currently-displayed playlist segment into m playlist sub-segments in response to the activation of the point 219a and restores to the currently-displayed playlist segment in response to the activation of the point 221a In the example of FIG. 13, the playlist shown by the window 310 is the active GUI element, so that the processor 10 may further divide the playlist segment shown in the window 310 in response to the reception of an additional two digits by repeating the steps shown in FIG. 16.

3.2 Alternative Embodiments of the Electronic Device

Figure 17:
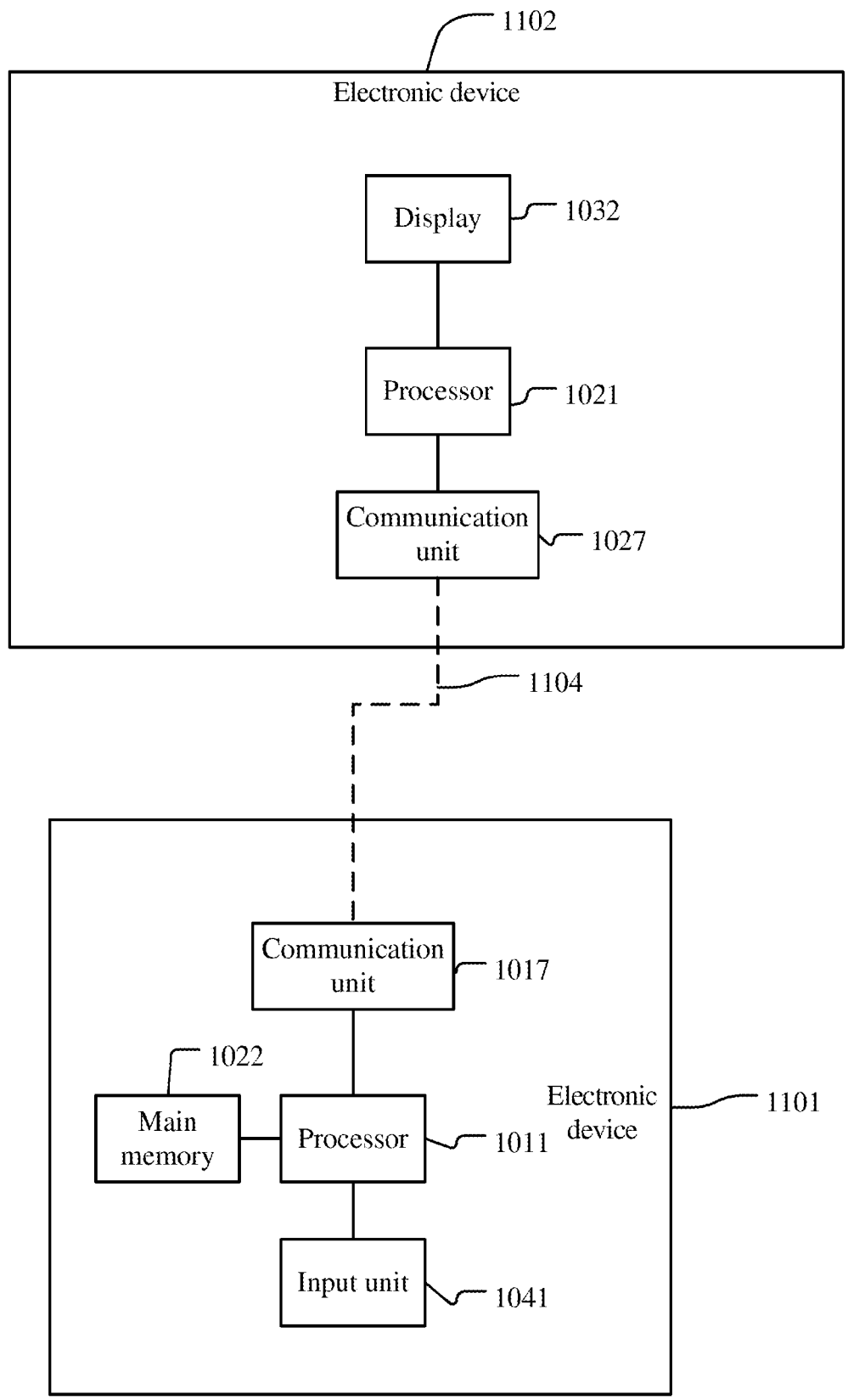
FIGS. 17-19 are block diagrams of alternative embodiments of the electronic device system of the disclosure.
Figure 18:
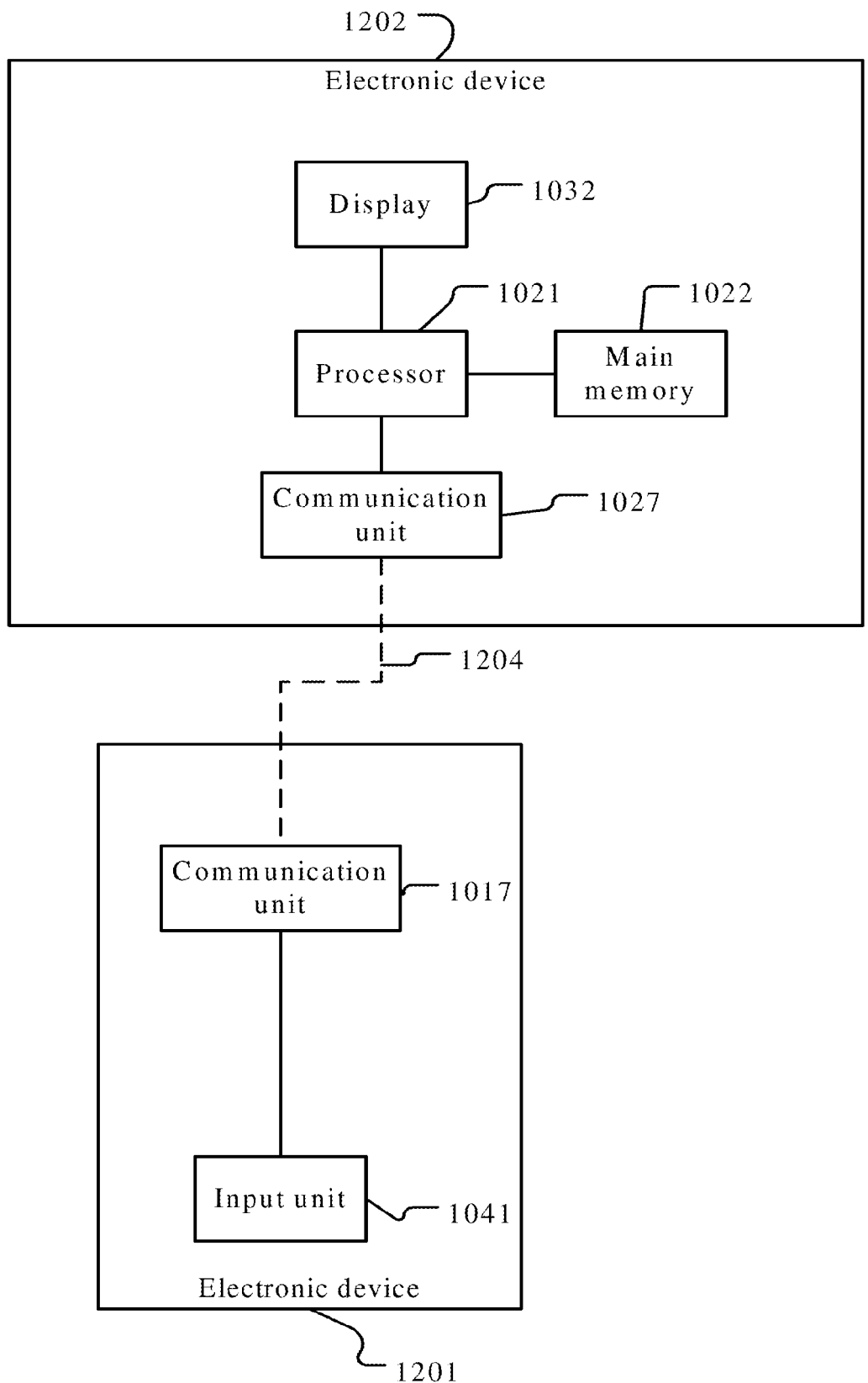
Figure 19:
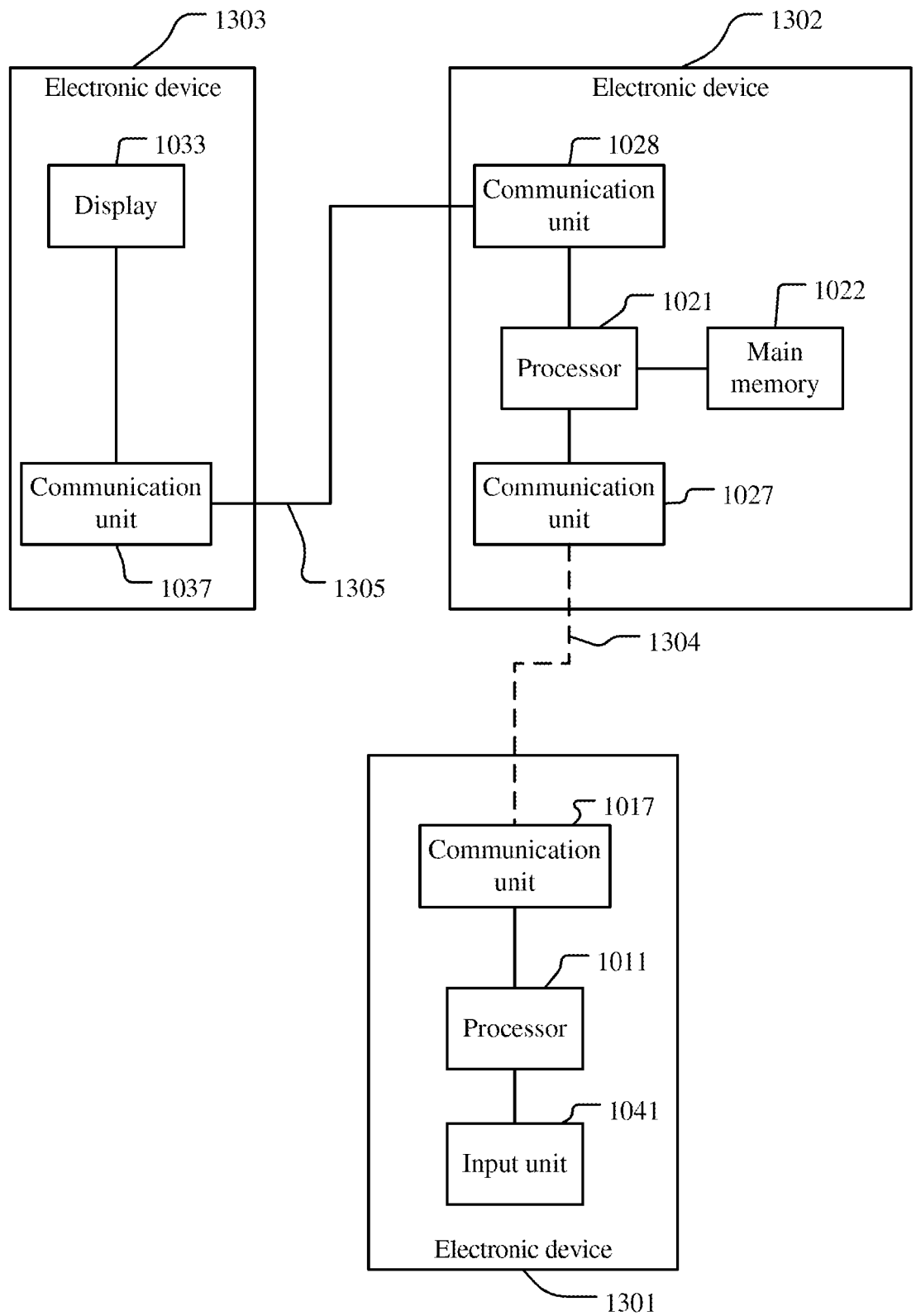

The exemplary embodiments of the positioning method can be executed in various systems, such as electronic device systems shown in FIGS. 17-19.

In FIG. 17, a processor 1011 of an electronic device 1101 executes the positioning method to receive digits from an input device 1041 and locate a segment of a target object stored in a main memory 1102. The processor 1011 generates GUI elements corresponding to the segment and the target object, and a communication unit 1017 transmits images of the GUI elements to a communication unit 1027 through a communication channel 1104. A processor 1021 displays the GUI elements received by the communication unit 1027 on a display 1032. The communication channel 1014 in FIG. 17 may transfer images and control signals between the electronic devices 1101 and 1102.

In FIG. 18, a communication unit 1017 of an electronic device 1201 transmits input signals generated by an input unit 1041 to the communication unit 1027 through the communication channel 1204. A processor 1021 in the electronic device 1202 generates digits from the input signals and locates a segment of a target object stored in a main memory 1022 based on the digits under the direction of the positioning method. The processor 1021 generates GUI elements corresponding to the segment and the target object, and displays the GUI elements on the display 1032.

In FIG. 19, a communication unit 1017 of an electronic device 1301 transmits input signals generated by an input unit 1041 to the communication unit 1027 through a communication channel 1304. A processor 1021 in the electronic device 1302 performs the positioning method based on input signals received by the communication unit 1027. The processor 1021 generates GUI elements corresponding to the segment and the target object, and a communication unit 1028 transmits images of the GUI elements to a communication unit 1037 through communication channel 1305. A display 1033 displays the GUI elements received by the communication unit 1037.

The communication channels 1104, 1204, 1304, and 1305 may be wired or wireless channels. Each of the electronic devices 1101, 1201, and 1301 may be a remote control or portable device, such as a PDA, an ultra mobile device (UMD), a laptop computer, or a cell phone. Each of the electronic devices 1102, 1202, and 1303 may comprise a television or a media player, such as a disc player. The electronic device 1302 may comprise a set-top box. The main memory 1022 in FIGS. 17-19 may store audio data and computer-readable program for implementing the positioning method.

4. CONCLUSION

The method utilizes digits to position playback of audio data and display of playlists. The method for positioning playback of audio data can be implemented in various electronic devices, such as cell phones, PDAs, set-top boxes, televisions, game consoles or media players.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for positioning playback of audio data, implemented in an electronic device system comprising a processor, a memory storing the audio data, a timer and numeric keys, the method comprising:

retrieving the audio data from the memory by the processor;

receiving a digit n from a numeric key by the processor and initiating the timer that keeps a predetermined time interval;

obtaining by the processor a proportion of a length of the audio data as a length of a first audio data segment in the audio data;

utilizing the length of the first audio data segment as a first unit of playback skipping and locating a second audio data segment in the audio data through a first playback skipping operation on the audio data in the first unit by the processor, wherein the first playback skipping operation is performed to locate the second audio data segment in response to the reception of the digit n, and the second audio data segment comprises the n-th audio data segment of the audio data;

determining by the processor whether the processor receives another digit m from the numeric keys before the timer expires;

performing a first playback operation on the n-th audio data segment in response to expiration of the timer if the processor does not receive the digit m before the timer expires; and obtaining by the processor a proportion of a length of the second audio data segment as a length of an audio data sub-segment in the second audio data segment;

utilizing the length of the audio data sub-segment as a second unit of playback skipping and locating a target position in the second audio data segment through a second playback skipping operation on the second audio data segment in the second unit by the processor, wherein the second playback skipping operation and resetting of the timer is performed in response to reception of the digit m if the processor receives another digit m from the numeric keys before the timer expires; and performing a second playback operation on the audio data based on the target position, wherein the target position is in the m-th audio data sub-segment in the n-th audio data segment, and the second playback operation is performed in response to expiration of the timer following the resetting.

2. The method as claimed in claim 1, wherein the first playback operation comprises playing, repeating of, or bookmark setting on the audio data based on the target position.

3. The method as claimed in claim 1, wherein the length of the first audio data segment is substantially equal to a quotient of dividing the length of the audio data by a first predetermined number, and the length of the audio data sub-segment is substantially equal to a quotient of dividing the length of the second audio data segment by a second predetermined number.

4. The method as claimed in claim 3, wherein the first and second predetermined numbers are positive integers stored in the memory before the first and second playback skipping operations.

5. The method as claimed in claim 4, wherein the electronic device system further comprises a direction key, and the processor obtaining the length of the first audio data segment or the length of the audio data sub-segment is in response to an operation on the direction key.

6. The method as claimed in claim 4, wherein the electronic device system further comprises a touch panel, and the processor obtaining the length of the first audio data segment or the length of the audio data sub-segment is in response to an operation on the touch panel.

7. The method as claimed in claim 3, wherein the processor receives the first and second predetermined numbers in response to operations on the numeric keys.

8. The method as claimed in claim 1, wherein the electronic device system further comprises a mobile phone, and the method further comprises determining by the processor whether to utilize the digit n for phone number input or for playback skipping.

9. An electronic device system comprising:
a memory operable to store audio data;
a timer operable to keep a predetermined period of time;
an input device responsive to operations thereon for generating input signals of numbers; and
a processor electrically connected to the memory, the timer, and the input device, and executing a method for positioning playback of audio data, the method comprising:
receiving a digit N from the input device and initiating the timer;
locating the N-th segment in the audio data in response to the reception of the digit N;
determining whether the processor receives another digit M from the input device before the timer expires;
performing a first playback operation on the N-th segment if the timer expires without reception of such digit M;
locating the M-th sub-segment in the N-th segment and resetting the timer if the processor receives the digit M from the input device before the timer expires; and
performing a second playback operation on the M-th sub-segment in response to expiration of the timer after reception of the digit M.

10. The system as claimed in claim 9, further comprising a mobile phone, wherein the method further comprises determining by the processor whether to utilize the digit N for phone number input or for audio data positioning.

11. The system as claimed in claim 9, wherein the first or second playback operation comprises audio playing, repeating, or bookmark setting based on the N-th or M-th segment.

12. The system as claimed in claim 9, wherein the input device comprises a touch panel, and the processor generates the digit N or M in response to operations on the touch panel.

13. The system as claimed in claim 9, wherein the input device comprises numeric keys, and the processor generates the digit N or M in response to operations on a numeric key.

14. An electronic device system comprising:
a memory operable to store audio data;
a timer;
an input device comprising numeric keys, and responsive to operations thereon for generating input signals of numbers; and
a processor electrically connected to the memory and the input device, and operable to execute a method for positioning playback of audio data, the method comprising:
retrieving the audio data from the memory;
receiving a digit n from a numeric key by the processor and initiating the timer that keeps a predetermined time interval;
obtaining a proportion of a length of the audio data as a length of a first audio data segment in the audio data;
utilizing the length of the first audio data segment as a first unit of playback skipping and locating a second audio data segment in the audio data through a first playback skipping operation on the audio data in the first unit, wherein the first playback skipping operation is performed to locate the second audio data segment in response to the reception of the digit n, and the second audio data segment comprises the n-th audio data segment of the audio data;
determining by the processor whether the processor receives another digit m from the numeric keys before the timer expires;
performing a first playback operation on the n-th audio data segment in response to expiration of the timer if the processor does not receive the digit m before the timer expires;
obtaining a proportion of a length of the second audio data segment as a length of an audio data sub-segment in the second audio data segment;
utilizing the length of the audio data sub-segment as a second unit of playback skipping and locating a target position in the second audio data segment through a second playback skipping operation on the second audio data segment in the second unit, wherein the second playback skipping operation and resetting of the timer is performed by the processor in response to reception of the digit m if the processor receives another digit m from the numeric keys before the timer expires; and
performing a second playback operation on the audio data based on the target position, wherein the target position is in the m-th audio data sub-segment in the n-th audio data segment, and the second playback operation is performed in response to expiration of the timer following the resetting.

15. The system as claimed in claim 14, wherein the electronic device system further comprises a microphone operable to receive signals representing the digit n and the digit m.

* * * * *